(12) United States Patent
Aoki et al.

(10) Patent No.: US 7,837,341 B2
(45) Date of Patent: Nov. 23, 2010

(54) DEFORMABLE MIRROR DEVICE

(75) Inventors: Sunao Aoki, Kanagawa (JP); Masahiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 192 days.

(21) Appl. No.: 11/799,614

(22) Filed: May 2, 2007

(65) Prior Publication Data

US 2007/0258158 A1 Nov. 8, 2007

(30) Foreign Application Priority Data

May 8, 2006 (JP) ............................. 2006-129252

(51) Int. Cl.
*G02B 5/08* (2006.01)
*G02B 7/185* (2006.01)
*G02B 7/188* (2006.01)

(52) U.S. Cl. ................ 359/846; 359/847; 250/215; 250/552; 369/112.29

(58) Field of Classification Search ............. 359/846, 359/848, 849, 847; 250/215, 552; 369/112.29, 369/122
See application file for complete search history.

(56) References Cited

U.S. PATENT DOCUMENTS

| 1,910,119 | A | * | 5/1933 | Moats ........................ 359/847 |
| 3,031,928 | A | * | 5/1962 | Kopito ....................... 359/847 |
| 3,071,036 | A | * | 1/1963 | McKnight et al. ........... 359/220 |
| 3,229,578 | A | * | 1/1966 | Smith ......................... 359/849 |
| 3,514,776 | A | * | 5/1970 | Mulready .................... 342/54 |
| 3,893,755 | A | * | 7/1975 | Cobarg et al. ............... 359/847 |
| 4,066,343 | A | * | 1/1978 | Scott .......................... 359/849 |
| 4,119,366 | A | * | 10/1978 | Lemaitre ..................... 359/847 |
| 4,196,972 | A | * | 4/1980 | Rawlings .................... 359/849 |
| 4,226,507 | A | * | 10/1980 | Fuschetto ................... 359/849 |
| 4,588,268 | A | * | 5/1986 | Aldrich ...................... 359/849 |
| 4,647,164 | A | * | 3/1987 | Sawicki et al. .............. 359/849 |
| 4,655,560 | A | * | 4/1987 | Glomb, Jr. .................. 359/849 |
| 5,357,825 | A | * | 10/1994 | Costello et al. ............. 359/846 |
| 5,365,379 | A | * | 11/1994 | Sawicki ...................... 359/846 |
| 5,754,219 | A | * | 5/1998 | Ruckl ......................... 347/256 |
| 5,777,807 | A | * | 7/1998 | Bar et al. .................... 359/845 |
| 6,317,229 | B1 | * | 11/2001 | Otterson ..................... 359/871 |
| 6,425,671 | B1 | * | 7/2002 | Adler et al. ................. 359/846 |
| 6,447,125 | B1 | * | 9/2002 | Huonker et al. ............. 359/846 |
| 6,836,459 | B2 | * | 12/2004 | Komoto ................. 369/112.23 |
| 6,840,638 | B2 | * | 1/2005 | Watson ....................... 359/849 |
| 7,295,331 | B2 | * | 11/2007 | Petasch et al. .............. 359/846 |
| 2007/0165312 | A1 | * | 7/2007 | Aoki et al. ................... 359/846 |

FOREIGN PATENT DOCUMENTS

| JP | 05-151591 | 6/1993 |
| JP | 09-152505 | 6/1997 |

* cited by examiner

*Primary Examiner*—Ricky D Shafer
(74) *Attorney, Agent, or Firm*—Wolf, Greenfield & Sacks, P.C.

(57) ABSTRACT

A deformable mirror device includes a flexible member formed so as to be deformable and having a mirror surface formed on its front surface, and a pressure generating section configured so that a direction of generation of a pressure to be applied to the flexible member is variable.

5 Claims, 18 Drawing Sheets

DEFORMABLE MIRROR DEVICE

CROSS REFERENCES TO RELATED APPLICATIONS

The present invention contains subject matter related to Japanese Patent Application JP 2006-129252 filed in the Japanese Patent Office on May 8, 2006, the entire contents of which are incorporated herein by reference.

BACKGROUND OF THE INVENTION

1. Field of the Invention

The present invention relates to a deformable mirror device whose mirror surface can be deformed.

2. Description of the Related Art

In optical disc apparatuses for performing recording and/or reproduction with respect to an optical disc recording medium, laser light from an objective lens is focused on the recording layer of the optical disc recording medium to thereby perform signal recording/reproduction.

It is known that when radiating laser light via the objective lens in this way, a spherical aberration occurs depending on the thickness of a cover layer (cover thickness) of the optical disc recording medium from the laser-light-incident side surface (recording-side surface) to the recording layer. That is, since the optical system of an optical disc apparatus including an objective lens is designed in such a way as to minimize spherical aberration in accordance with the value of a cover thickness assumed for the corresponding optical disc recording medium, a spherical aberration occurs if the cover thickness differs from the assumed value. In the case where the recording layer is made of a single layer, for example, it is known that a spherical aberration occurs at a portion of the recording layer where cover thickness variations exist.

In recent years, some optical disc apparatuses are provided with multiple recording layers in order to achieve higher recording density. In the case where multiple recording layers are provided in this way, since the cover thickness is naturally made to differ among the respective recording layers, a spherical aberration occurs when performing recording/reproduction with respect to a recording layer other than the recording layer that serves as a reference.

When a spherical aberration occurs, the imaging performance deteriorates and hence the signal recording/reproduction performance also deteriorates. Some means for correcting such a spherical aberration is thus required.

Examples of the related art techniques aimed at correcting such a spherical aberration resulting from variations in the cover thickness of an optical disc recording medium include one in which correction is performed by deforming the profile of a mirror that is provided to guide laser light to an objective lens in the optical system (see Japanese Unexamined Patent Application Publication No. 5-151591 and Japanese Unexamined Patent Application Publication No. 9-152505).

That is, the deformable mirror disclosed in Japanese Unexamined Patent Application Publication No. 5-151591 mentioned above includes a deformation plate having a mirror surface formed on its front side, and piezoelectric actuators for pressurizing several locations on the back side of this deformation plate. By changing the voltage applied to each piezoelectric actuator, the above-mentioned mirror surface is changed to a desired profile that enables correction of spherical aberration.

Further, in the deformable mirror disclosed in Japanese Unexamined Patent Application Publication No. 9-152505, after forming a flexible member having a mirror surface formed on its front side, and a reference surface of a predetermined profile below the flexible member, the flexible member is adsorbed onto the reference surface or the adsorption is released, thereby obtaining two desired profiles. That is, the profile of the reference surface is set such that the profile of the mirror surface upon adsorption becomes a profile that enables correction of spherical aberration, thereby making it possible to correct spherical aberration.

SUMMARY OF THE INVENTION

Of the related art examples mentioned above, according to the example in which piezoelectric actuators are provided, a plurality of piezoelectric actuators are required for obtaining a desired mirror surface profile, which adds complexity to the construction, and also leads to a corresponding increase in circuit scale.

For example, for adaptation to high-density discs of the recent years with a laser beam diameter of, for example, about 4 mm, it is extremely difficult to realize a construction in which a plurality of piezoelectric actuators are formed within this area.

Further, according to the example in which a reference surface is provided, although the circuit scale can be reduced as compared with the case where a plurality of actuators are provided, only two profiles corresponding to the absorption and release states can be obtained in this case. This means that it is not possible to perform spherical aberration correction effectively with respect to an optical disc in which more than three recording layers are formed.

On the other hand, examples of aberration that can occur when radiating laser light to an optical disc recording medium via an objective lens include an off-axis aberration such as a comatic aberration or astigmatism in addition to an on-axis aberration such as a spherical aberration mentioned above.

However, neither of the related art documents mentioned above describes about correction of an off-axis aberration such as a comatic aberration or astigmatism. Further, even if correction of an off-axis aberration is possible, as described above as the problem associated with spherical aberration correction, in the example where piezoelectric actuators are provided, a plurality of piezoelectric actuators are required for obtaining a predetermined mirror surface profile, which adds complexity to the construction, and also leads to a corresponding increase in circuit scale. Further, according to the example in which a reference surface is provided, it is not possible to perform various kinds of aberration correction effectively with respect to an optical disc in which more than three recording layers are formed.

In view of this, it is desirable to configure a deformable mirror provided for effecting aberration correction in an optical system such that correction can be performed also with respect to an off-axis aberration other than a spherical aberration, and aberration correction can to be effectively performed by means of simple configuration also with respect to an optical disc recording medium having more than three recording layers.

In view of the above-mentioned problems, according to the present invention, a deformable mirror device is configured as follows.

That is, a deformable mirror device according to an embodiment of the present invention includes: a flexible member formed so as to be deformable and having a mirror surface formed on its front surface; and pressure generating means configured so that a direction of generation of a pressure to be applied to the flexible member is variable.

When the flexible member having the mirror surface formed thereon is adapted to have local variations in state in terms of deformation behavior as mentioned above, upon application of the pressure generated by the pressure generating means to the flexible member, deformation behaviors different from those of the other portions are obtained in such portions that are made to differ in their state. Accordingly, depending on the formation pattern of such portions that differ in state, a desired deformation profile can be obtained in response to the application of a (uniform) pressure with respect to a single point of the flexible member.

Further, depending on the formation pattern of the above-mentioned portions that differ in state, a desired deformation profile can be also obtained in a stepwise fashion in accordance with the level of the applied pressure. Accordingly, unlike in the case of obtaining a desired deformation profile by adsorbing the flexible member onto the reference surface as in the related art, it is possible to obtain more than two kinds of mirror surface deformation profile.

Further, according to the present invention, a pressure that is generated so as to be variable in its direction can be applied to the flexible member by the pressure generating means. Accordingly, for example, in the case where the pressure applying section that applies a pressure to the above-mentioned flexible member is secured to, for example, the flexible member, the direction of the pressure applied to the flexible member can be made variable. Alternatively, in the case where the pressure applying section is adapted to apply a pressure to the flexible member without being secured to the flexible member, the pressure application point (application position) with respect to the flexible member can be made variable.

When the application direction or application point of a pressure with respect to the flexible member can be made variable in this way, unlike in the case where a pressure can be applied simply in the same direction or at the same position, the vertex position of the flexible member (mirror surface) when deformed can be shifted from the center point in correspondence to an off-axis aberration, thereby making it possible to obtain a mirror surface deformation profile for effecting not only spherical aberration correction but also correction of an off-axis aberration such as a comatic aberration or astigmatism.

In this way, according to the present invention, due to the configuration of the flexible member having the mirror surface formed thereon, only one point suffices as the pressure application point with respect to the above-mentioned flexible member to obtain a desired deformation profile of the mirror surface. Accordingly, there is no need to pressurize a plurality of points by a plurality of piezoelectric actuators in order to obtain a desired deformation profile as in the related art, thereby making it possible to effectively prevent the size and cost of the apparatus from increasing.

Further, according to the configuration of the flexible member mentioned above, it is also possible to allow a desired deformation profile to be obtained in a stepwise fashion in accordance with the level of the applied pressure. Accordingly, unlike in the related art in which a desired deformation profile is obtained by adsorbing the flexible member onto the reference surface, more than two kinds of deformation profile can be obtained for the mirror surface.

Furthermore, with the deformable mirror device according to an embodiment of the present invention, a pressure that is generated so as to be variable in its direction can be applied to the flexible member, thereby allowing the pressure application direction or application point with respect to the flexible member to be made variable. Accordingly, it is possible to obtain a mirror surface deformation profile for effecting not only spherical aberration correction but also correction of an off-axis aberration such as a comatic aberration or astigmatism.

Therefore, according to the present invention, it is possible to provide a deformable mirror device which enables correction to be performed also with respect to an off-axis aberration other than a spherical aberration, and which can perform aberration correction effectively by means of simple configuration also with respect to an optical disc recording medium having more than three recording layers.

DESCRIPTION OF THE PREFERRED EMBODIMENTS

The best mode for carrying out the present invention (hereinafter, referred to as the embodiment) will be described below.

Figure 1:
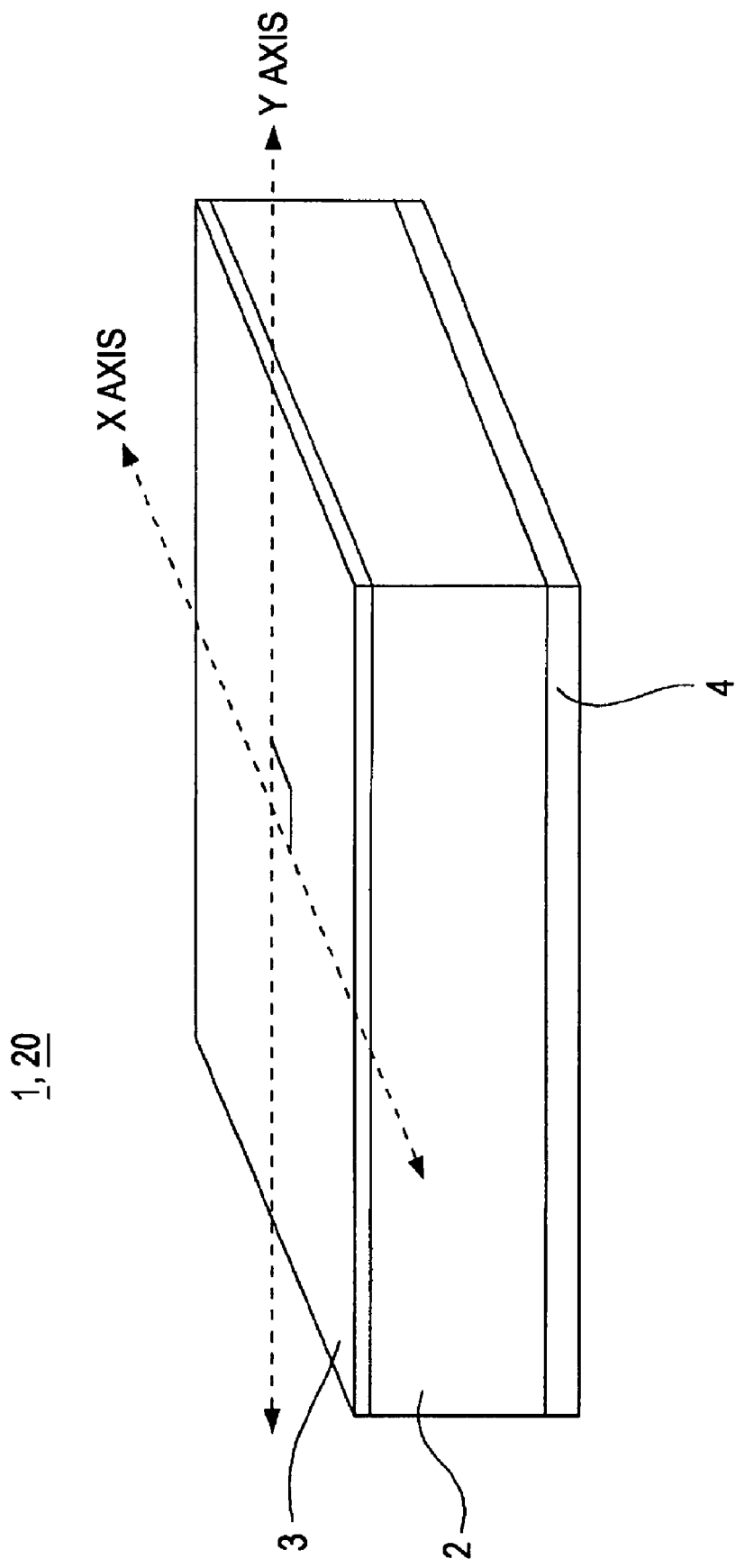
FIG. 1 is an exterior view of a deformable mirror device according to an embodiment of the present invention.

First, FIG. 1 is a perspective exterior view of a deformable mirror device (deformable mirror device 1, 20) according to this embodiment.

It should be noted that since the exterior appearance and configuration are common between the deformable mirror device 1 according to a first embodiment and the deformable mirror device 20 according to a second embodiment, the deformable mirror device 1 and the deformable mirror device 20 are collectively described here.

As shown in the drawing, in the deformable mirror device 1, 20, a flexible member 2 is secured onto a base 4 serving as a substrate. Further, a reflective film 3 made of, for example, aluminum is formed on a surface (front surface) of the flexible member 2 opposite to the surface that is secured to the above-mentioned base 4. The formation of the reflective film 3 with respect to the flexible member 2 may be performed by, for example, spattering.

In this case, the flexible member 2 is formed such that at least its surface on which the above-mentioned reflective film 3 is formed (also referred to as the mirror surface) has flexibility.

Figure 2:
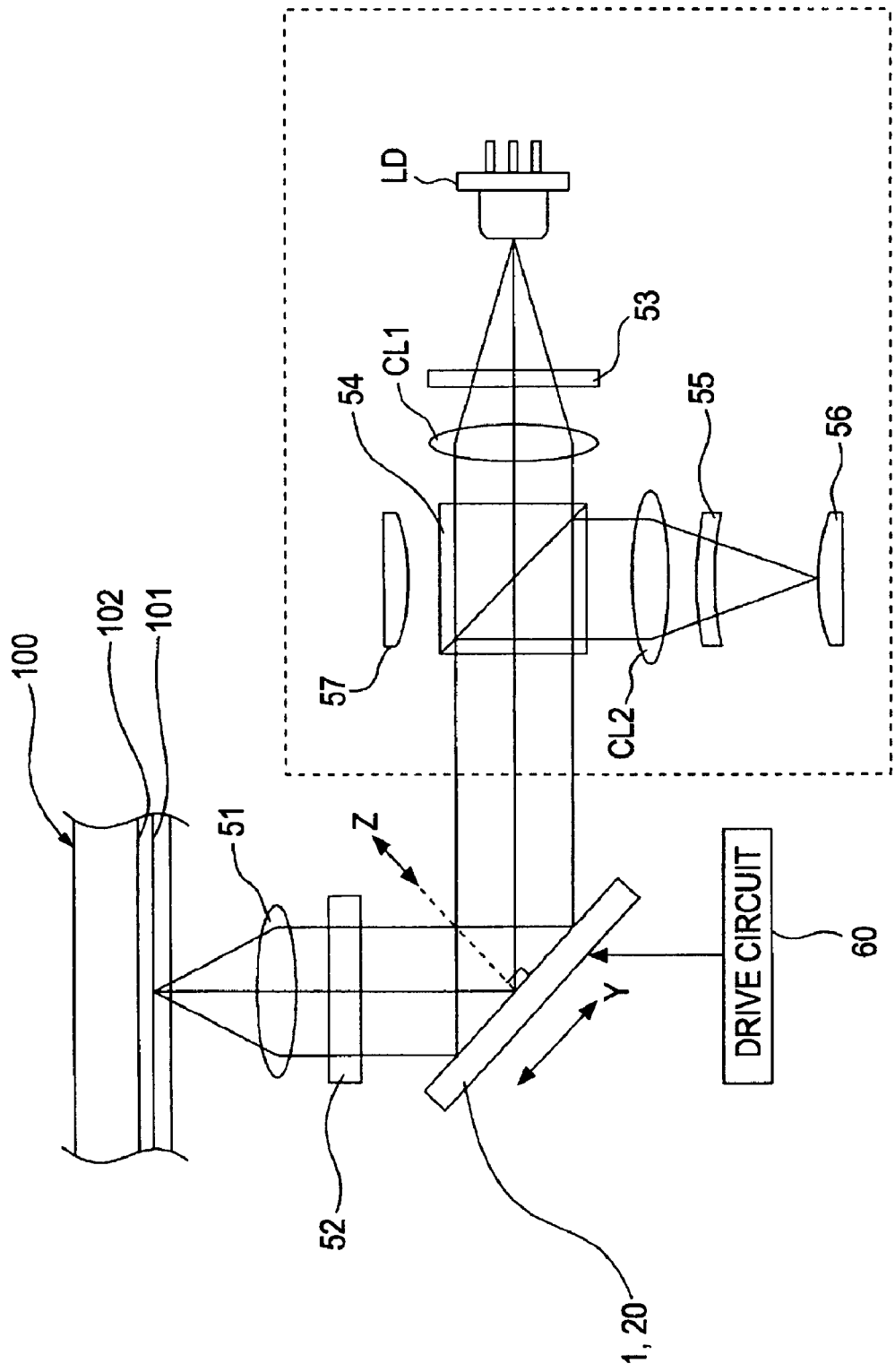
FIG. 2 is a view showing an example of the configuration of the optical system of an optical disc apparatus including the deformable mirror device according to the embodiment.

FIG. 2 shows the configuration of the optical system of an optical disc apparatus to which the deformable mirror device (1, 20) according to the embodiment is to be equipped.

First, FIG. 2 shows an optical disc 100.

The embodiment assumes as the optical disc 100 a high recording density disc such as a Blu-ray Disc (registered trademark). Recording/reproduction is performed under the conditions of, for example, a numerical aperture (NA) of an objective lens 51=0.85 and a laser wavelength of 405 nm.

Further, as shown in the drawing, the optical disc 100 in this case has, for example, two recording layers.

First, a first recording layer 101 is formed at the position closest to the surface (recording surface) of the optical disc 100 on which laser light is incident. In this case, the spacing from the recording surface to the first recording layer 101 is set to, for example, 0.075 mm. That is, the cover thickness from the recording surface to the first recording layer 101 is 0.075 mm.

Further, a second recording layer 102 is formed at a predetermined spacing from the first recording layer 101.

The spacing between these respective recording layers is set to, for example, 25 μm. Accordingly, the cover thickness of the second recording layer 102 is 0.100 mm.

As the optical system for performing reading/writing of a signal with respect to the above-described optical disc 100 assumed in the embodiment, FIG. 2 shows the objecting lens 51, a ¼ wavelength plate 52, the deformable mirror device 1, 20, a grating 53, a polarization beam splitter 54, a multi-lens 55, a detector 56, a front monitor 57, a semiconductor laser LD, a collimator lens CL1, and a collimator lens CL2.

In the above-mentioned optical system, laser light emitted from the semiconductor laser LD transmits through the grating 53 and the collimator lens CL1 to enter the polarization beam splitter 54. A part of the laser light that has entered the polarization beam splitter 54 is reflected and guided to the front monitor 57.

Further, the laser light that has transmitted through the polarization beam splitter 54 is made incident on the deformable mirror device (1, 20) provided at an inclination of 45° as shown in the drawing and serving as a so-called rising mirror (45° mirror). Then, the laser light is reflected 90° by the deformable mirror device (1, 20) serving as a rising mirror, and this reflected laser light is radiated to the optical disc 100 via the ¼ wavelength plate 52 and the objective lens 51.

In this way, the deformable mirror device 1, 20 according to the embodiment shown in FIG. 1 is provided as a 45° mirror in the optical system.

Further, while the optical disc apparatus including the deformable mirror device 1, 20 according to the embodiment is also provided with a drive circuit 60 that supplies electric power for deforming the mirror surface of the deformable mirror device 1, 20 as shown in the drawing, the description in this regard will be given later.

Figure 3:
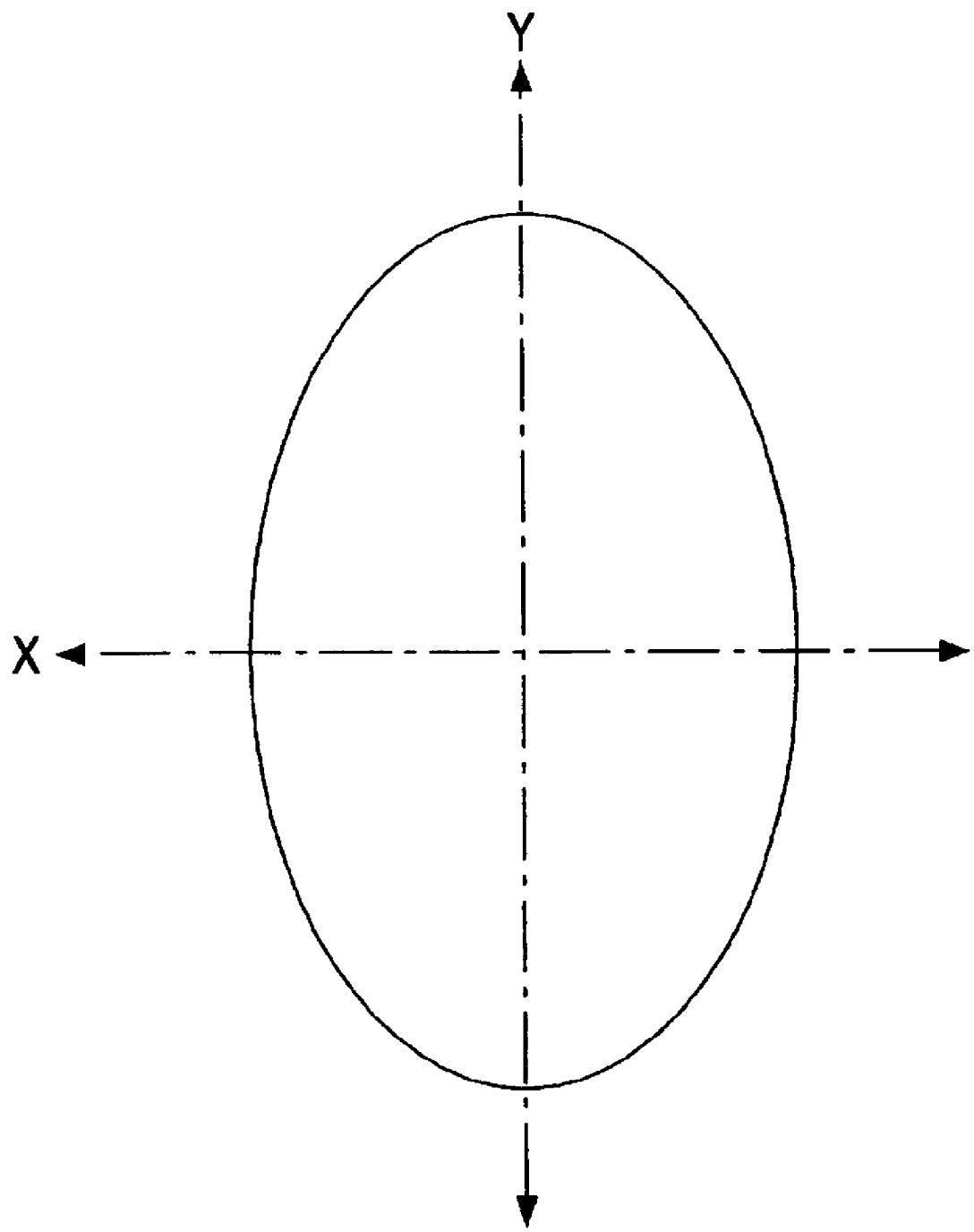
FIG. 3 is a view exemplifying the shape of a laser spot formed on the mirror surface of the deformable mirror device according to the embodiment.

It is stated here by way of explanation that an elliptical laser spot as shown in FIG. 3 is formed as the laser spot formed on the mirror surface of the deformable mirror device 1, 20 installed as a 45° mirror as mentioned above. That is, when viewing the mirror surface from the Z-axis direction in FIG. 2 mentioned above, with respect to the Y-axis direction and the X-axis direction perpendicular to the Y-axis direction in FIG. 2, the laser spot has such an elliptical shape that the ratio between the diameters in the X-axis direction and in the Y-axis direction in FIG. 3 becomes approximately X:Y=1:2.

Incidentally, in the case where a plurality of recording layers are formed on the optical disc 100 as mentioned above, the optical system of the optical disc apparatus is designed such that the amount of spherical aberration becomes minimum at the time of focusing with respect to, for example, the first recording layer 101 located closest to the recording surface. That is, in the above-mentioned example, the optical system is designed such that the amount of spherical aberration becomes minimum in correspondence with, for example, the cover thickness of 0.075 mm of the first recording layer 101.

However, when the amount of spherical aberration is set to become minimum at the time of focusing onto the first recording layer 101, inevitably, the amount of spherical aberration tends to increase at the time of focusing onto the second recording layer 102.

Further, examples of aberration that can occur when radiating laser light to an optical disc recording medium via the objective lens 51 as in the configuration shown in FIG. 2 include an off-axis aberration such as a comatic aberration or astigmatism in addition to an on-axis aberration such as a spherical aberration.

It should be noted that the term on-axis aberration as used herein refers to an aberration that occurs when a light beam is made incident without being inclined with respect to the objective lens, and the term off-axis aberration refers to an aberration that occurs when a light beam is made incident while being inclined with respect to the objective lens.

This embodiment aims at correcting such various kinds of aberration by deforming the mirror surface profile of the deformable mirror device 1, 20 into a predetermined deformation profile for correcting aberrations, and modulating the laser light that is reflected by this mirror surface and guided to the objective lens 51.

Hereinbelow, as an example of the deformable mirror device for performing such aberration correction, the deformable mirror device 1 according to the first embodiment will be described first.

First Embodiment

Figure 4A:
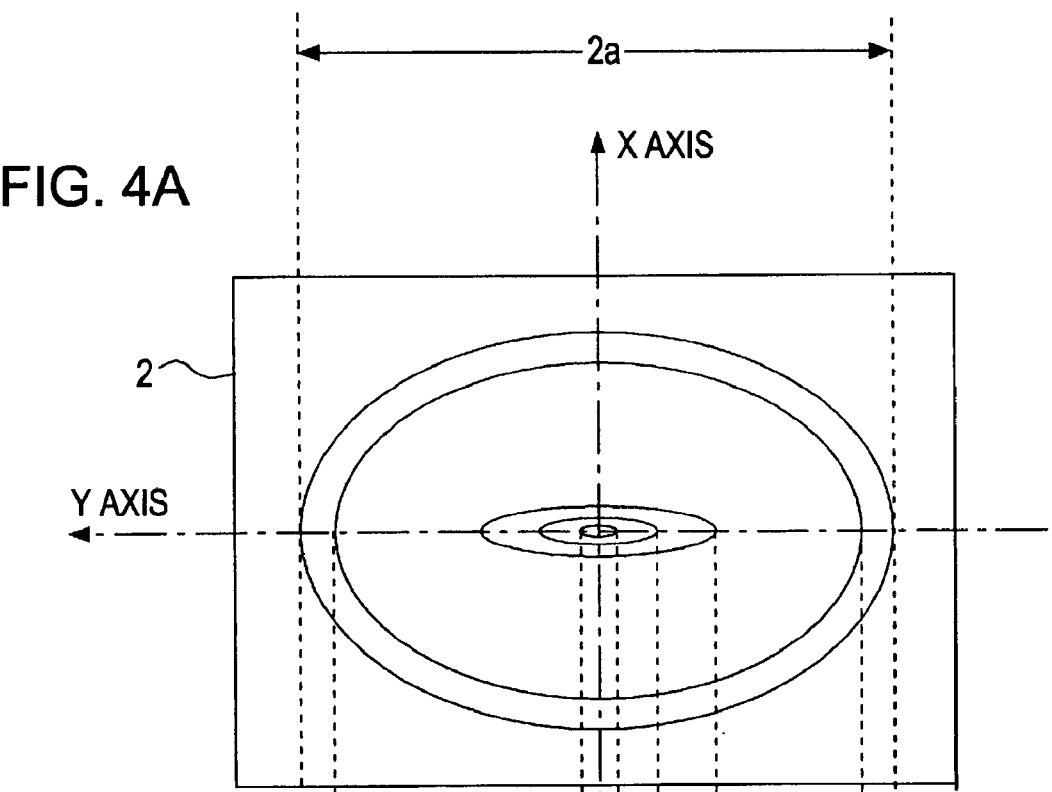
FIGS. 4A and 4B are views illustrating the structure of a flexible member included in the deformable mirror device according to the embodiment.
Figure 4B:
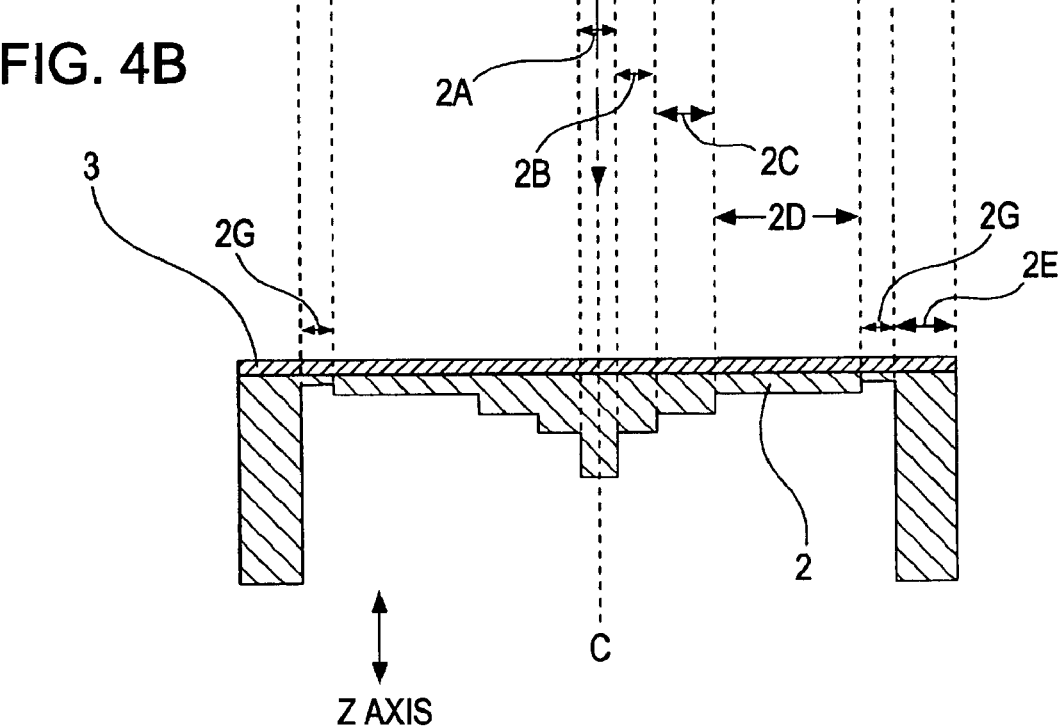

First, FIGS. 4A and 4B show the structure of the above-described flexible member 2 equipped in the deformable mirror device 1 according to the first embodiment. Of FIGS. 4A and 4B, FIG. 4A is a plan view of a surface of the flexible member 2 opposite to the mirror surface (that is, the back side of the mirror surface), and FIG. 4B is a sectional view of the flexible member 2.

In FIGS. 4A and 4B, in the flexible member 2, a strength distribution pattern 2a as shown in the drawings is formed so as to impart a predetermined strength distribution.

As shown in the drawings, as the strength distribution pattern 2a, a pattern that is convex in the direction opposite to the mirror surface is formed in the surface opposite to the mirror surface on which the reflective film 3 is formed. In this embodiment, as such a convex pattern, there is formed a pattern including a plurality of elliptical portions 2A, 2B, 2C, 2D, and 2G shown in the drawings which have a mirror surface center C as the same center.

Of the plurality of elliptical portions 2A, 2B, 2C, 2D, and 2G, the elliptical portion 2A formed so as to include the center C has the largest thickness with respect to the Z-axis direction. Subsequently, the thickness in the Z-axis direction progressively decreases in the order of the elliptical portion 2B formed on the outer peripheral side adjacent to the elliptical portion 2A, the elliptical portion 2C further formed on the outer peripheral side adjacent to the elliptical portion 2B, the elliptical portion 2D further formed on the outer peripheral side adjacent to the elliptical portion 2C, and the elliptical portion 2G further formed on the outer peripheral side adjacent to the elliptical portion 2D. That is, as shown in FIG. 4B, the sectional profile of the flexible member 2 in this case is such that the flexible member 2 becomes progressively thinner in a stepwise fashion from the center C toward the outer periphery thereof.

Due to such a structure, the flexible member 2 is formed so as to include portions that differ in cross-sectional thickness. Each one of the individual elliptical portions 2 differing in cross-sectional thickness as described above serves as a portion that differs from other portions in state in terms of deformation behavior. That is, this elliptical portion 2 serves to impart a predetermined strength distribution to the flexible member 2. In that sense, the area where the individual elliptical portions 2 mentioned above are formed is herein referred to as the strength distribution pattern 2a.

Seen from a different perspective, the fact that portions differing in cross-sectional thickness are formed as mentioned above means that when a pressure is applied to the flexible member 2 as will be described later, the deformation curvature varies at different locations on the flexible member 2.

Further, in this case, in the area of the flexible member 2 which is located on the outer peripheral side with respect to the area where the above-mentioned elliptical portion 2G is formed, there is formed a rib-like frame 2E for securing a sufficient strength for preventing this area from being deformed upon application of a pressure to the flexible member 2 as will be described later.

In the deformable mirror device (1, 20), the distal end portion of the frame 2E, which is formed in the outer peripheral portion of the flexible member 2 as described above, is secured to the base 4 described above with reference to FIG. 1.

In the flexible member 2 configured as described above, the area from the elliptical portions 2A to 2G is the area where the flexible member 2 undergoes deformation as a deformable mirror. That is, in this embodiment, on the basis of the formation pattern of the elliptical portions 2A to 2G made to differ in thickness, a predetermined deformation profile of the mirror surface can be obtained upon application of a pressure acting in the Z-axis direction.

Further, as described above, the frame 2E having a sufficient strength for resisting deformation upon pressure application is formed in the outer peripheral portion of the area from the deformable elliptical portions 2A to 2G mentioned above. Since the outer peripheral portion of the flexible member 2 serving as the frame 2E thus does not deform upon application of a pressure and retains a sufficient strength, the deformation profile of the variable portion from the elliptical portions 2A to 2G can be readily made to conform to an ideal deformation profile. That is, as compared with a case where the outer peripheral portion of the flexible member 2 is subject to deformation, the deformation profile of the mirror surface can be approximated to an ideal profile with greater accuracy.

Further, according to the above description, in the flexible member 2 in this case, a portion (specifically, the elliptical portion 2G) where the cross-sectional thickness becomes the smallest is formed at the boundary portion between the frame 2E on the most outer peripheral side where the cross-sectional thickness is set to be the largest to secure a strength, and the mirror surface center C side.

In this way, by forming a portion where the cross-sectional thickness becomes the smallest (also referred to as the thin-walled portion 2G) at the boundary portion between the frame 2E on the most outer peripheral side where the cross-sectional thickness is set to be the largest to secure a strength, and the mirror surface center C side, the thin-walled portion 2G becomes a portion that is most readily deformed upon application of a pressure to the flexible member 2.

In this case, the readiness to deformation in the thin-walled portion 2G can be determined by the thickness of the thin-walled portion 2G. That is, by setting the thickness of the thin-walled portion 2G small, the curvature of deformation in the thin-walled portion 2G upon application of a pressure to the flexible member 2 can be made larger.

A large curvature of deformation is thus attained in the thin-walled portion 2G, which is adjacent to the frame 2E located on the most outer peripheral side where a strength is secured, upon application of a pressure, whereby even when the surface area of the elliptical portion 2D located adjacent to the mirror surface center C side of the thin-walled portion 2G is set small, the deformation profile of the mirror shape can be readily made to conform to a desired deformation profile.

That is, in the case where the thin-walled portion 2G with such an intentionally reduced cross-sectional thickness is not provided at the portion adjacent to the frame E, to make the deformation profile in the laser-incident portion (deformation portion necessary for aberration correction) of the mirror surface conform to a desired deformation profile, a large sectional surface area is secured for the elliptical portion 2D that becomes the smallest-thickness portion in that case. In this regard, when the thin-walled portion 2G as described above is provided, it becomes easier to obtain a desired deformation profile starting from the portion close to the frame 2E on the outer periphery, thereby making it easier to make the deformation profile of the mirror surface conform to a desired deformation profile even when the surface area of the elliptical portion 2D is set small.

If the surface area of the elliptical portion 2D can be set small in this way, the flexible member 2 can be reduced in size. Since the flexible member 2 can be thus reduced in size, it is also possible to achieve a reduction in the overall size of the deformable mirror device 1.

It should be noted that in this case, if the width of the thin-walled portion 2D is set to be uniform over the entire periphery, the transmission of pressure in the thin-walled portion 2G can be made uniform, thereby making it easier to make the deformation profile of the mirror surface conform to a desired deformation profile.

It is stated here by way of explanation that in this case, the patterns of the portions differing in state in terms of deformation behavior are formed by elliptical shapes having the same center as described above because, as explained above with reference to FIG. 3, the deformable mirror device in this case is adapted to perform aberration correction with respect to incident laser light by forming an elliptical spot.

Figure 5:
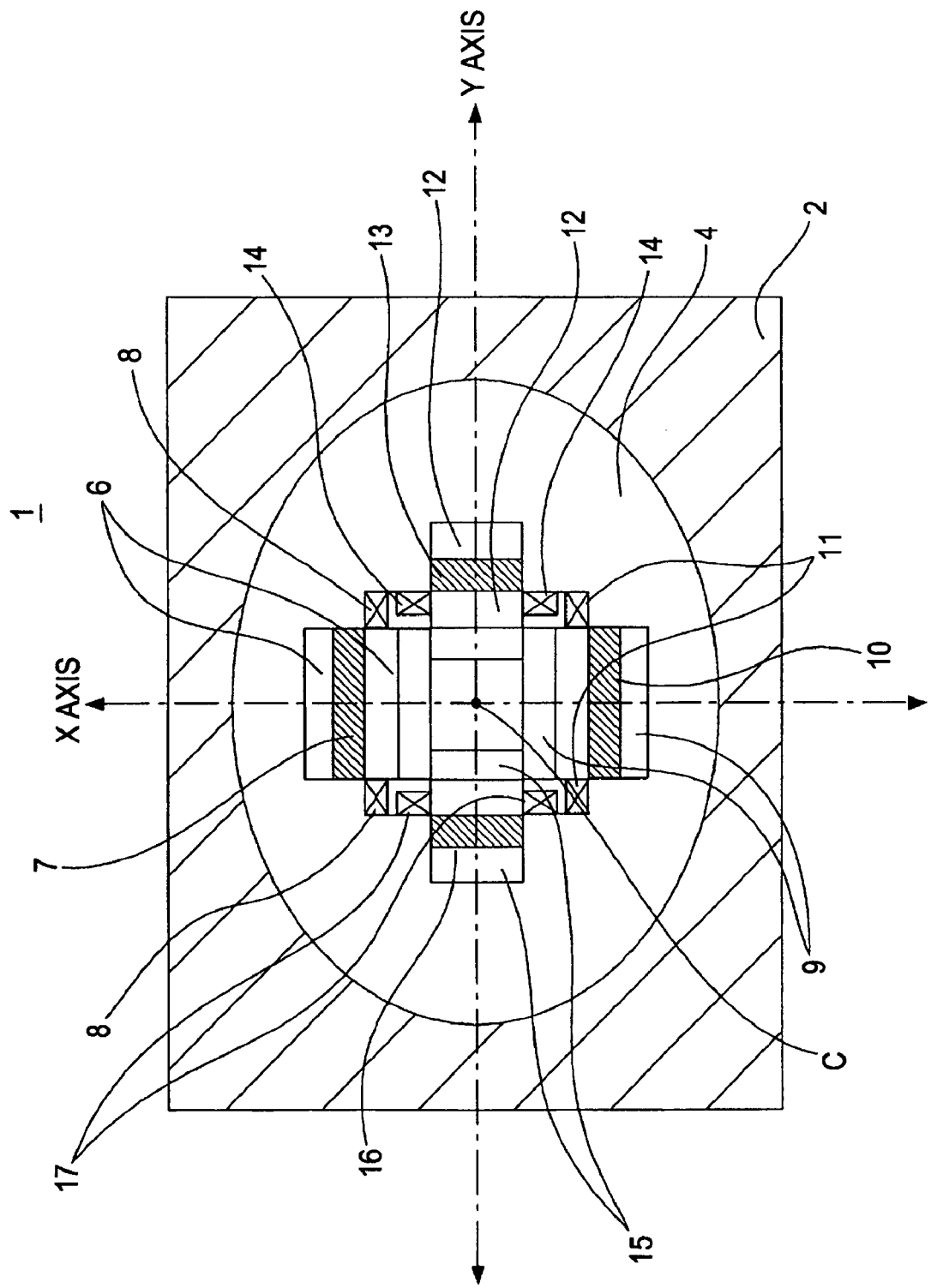
FIG. 5 is a sectional view showing the internal configuration of a deformable mirror device according to a first embodiment of the present invention.
Figure 6:
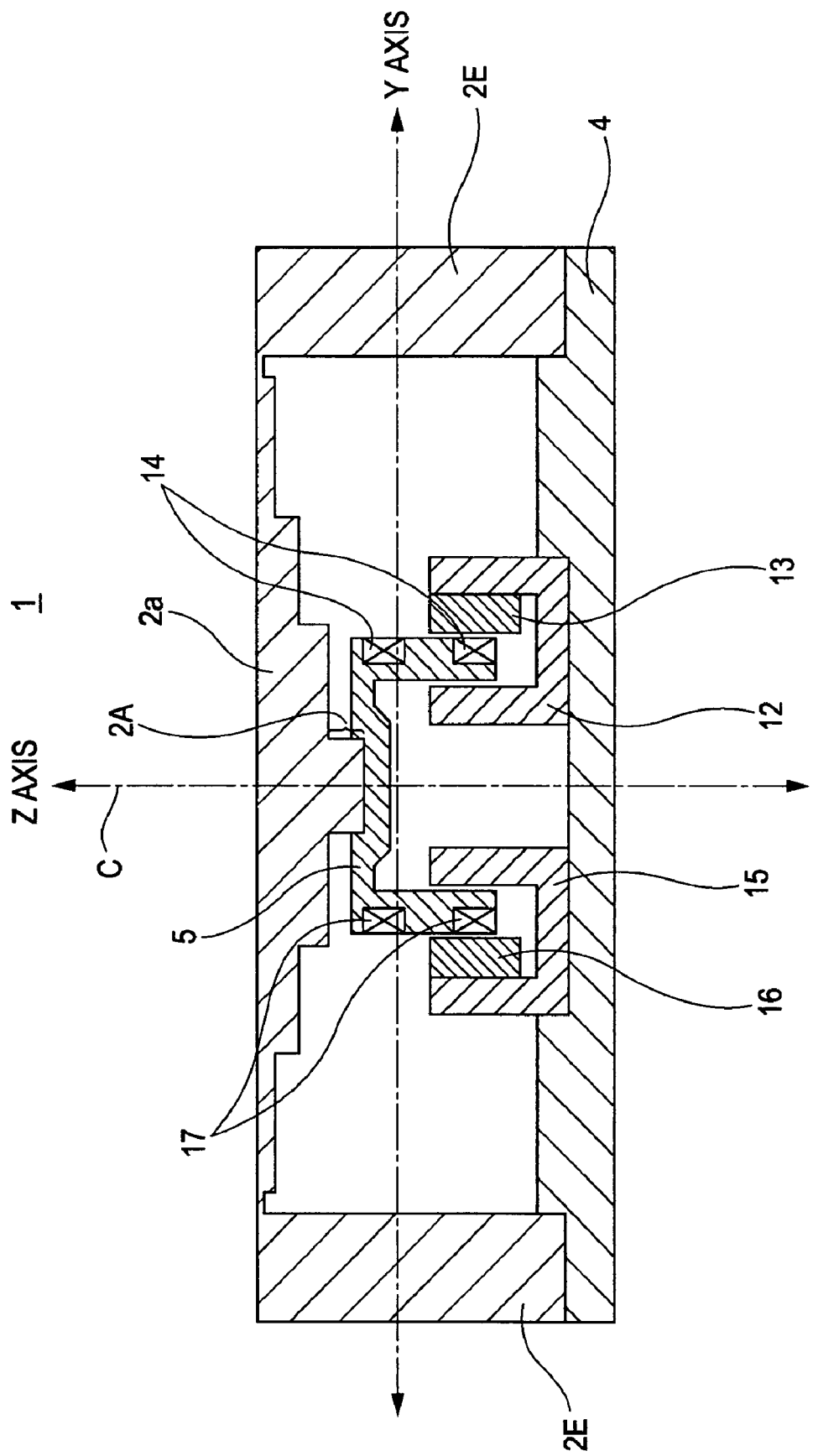
FIG. 6 is a sectional view showing the internal configuration of the deformable mirror device according to the first embodiment.
Figure 7:
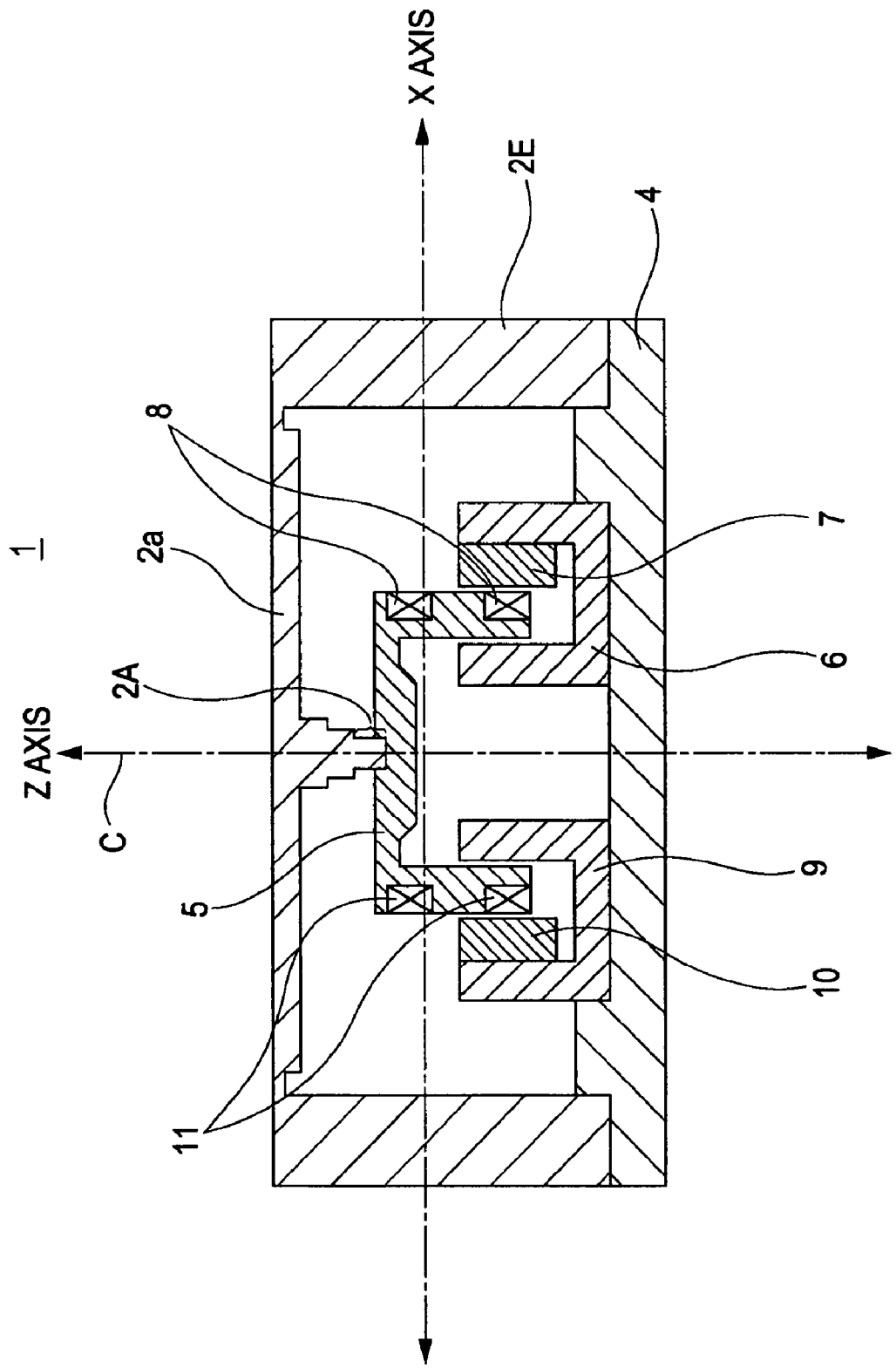
FIG. 7 is a sectional view showing the internal configuration of the deformable mirror device according to the first embodiment.

FIGS. 5, 6, and 7 are sectional views showing the internal configuration of the deformable mirror device 1 according to the first embodiment.

FIG. 5 is a sectional view of the deformable mirror device 1 taken along the X-Y plane defined by the X axis and the Y axis shown in FIG. 1, FIG. 6 is a sectional view of the same taken along the Y-Z plane defined by the Y axis and the Z axis shown in FIG. 1, and FIG. 7 is a sectional view of the same taken along the X-Z plane defined by the X axis and the Z axis shown in FIG. 1.

In the first embodiment as well as in the second embodiment that will be described later, the mirror surface (reflective film 3) of the flexible member 2 is omitted in the drawings below. However, in actuality, as described above with reference to FIGS. 4A and 4B, the mirror surface is formed on the front surface of the flexible member 2.

In FIGS. 5 to 7 mentioned above, first, the distal end portion of the frame E in the flexible member 2 is secured as shown in the drawings to the base 4 shown in FIG. 1 described above.

Then, as will be appreciated by referring to FIGS. 6 and 7 in particular, a coil holder 5 is secured to the elliptical portion 2A, which is formed so as to include the mirror surface center C, of the flexible member 2 thus secured to the base 4. The coil holder 5 is formed so as to have a reverse U-shaped configuration as seen in the Z-Y cross section of FIG. 6 or in the X-Z cross section of FIG. 7. A fitting portion for fitting engagement with the elliptical portion 2A is formed at the upper surface portion of this reverse U-shaped configuration. That is, the elliptical portion 2A and the coil holder 5 are secured to each other at this fitting portion.

In this case, the formation position of the above-mentioned fitting portion is determined such that the mirror surface center C and the center position in the X-Y plane of the coil holder 5 coincide with each other upon bringing the elliptical portion 2A and the coil holder 5 into fitting engagement with each other.

In the above-mentioned coil holder 5, a first coil 8, a second coil 11, a third coil 14, and a fourth coil 17 are wound around four peripheral surfaces (also referred to as the leg surfaces) excluding the upper surface where the above-mentioned fitting portion is provided. As will be appreciated by referring to the sectional views of FIGS. 5 to 7, each of these coils (8, 11, 14, and 17) is wound so as to extend circumferentially along the spare shape of the corresponding leg surface. The shape of each coil that has been wound thus forms a square.

That is, for example, as for the first coil 8 shown in FIG. 5, the cross section with respect to the two sides extending in the Z-axis direction of the first coil 8 wound in the shape of a square as described above is shown. Likewise, for example, as for the third coil 14 shown in FIG. 5 as well, the cross section with respect to the two sides extending in the Z-axis direction of the third coil 14 wound in the shape of a square is shown.

On the other hand, as for the third coil 14 shown in FIG. 6, the cross section with respect to the two sides extending in the X-axis direction of the third coil 14 wound in the shape of a square as described above is shown. Likewise, as for the first coil 8 shown in FIG. 7 as well, the cross section with respect to the two sides extending in the Y-axis direction of the first coil 8 wound in the shape of a square is shown.

A first yoke 6, a second yoke 9, a third yoke 12, and a fourth yoke 15 are provided as shown in the drawings for the respective leg portions (portions having the above-mentioned leg surfaces) of the coil holder 5 on which the first coil 8, the second coil 11, the third coil 14, and the fourth coil 17 are wound.

Each of these four yokes has a U-shaped cross section, with the corresponding leg portion being held in a sandwiched fashion in the opening between the U-shaped upper portions thereof.

As shown in the drawings, the first yoke 6 is provided so as to sandwich the leg portion of the coil holder 5 on which the first coil 8 is wound. A first magnet 7 is secured to the surface of the first yoke 6 opposed to the above-mentioned first coil 8.

Likewise, the second yoke 9 is provided so as to sandwich the leg portion of the coil holder 5 on which the second coil 11 is wound. A second magnet 10 is secured to the surface of the second yoke 9 opposed to the above-mentioned second coil 11.

Further, the third yoke 12 is provided so as to sandwich the leg portion of the coil holder 5 on which the third coil 14 is wound. A third magnet 13 is secured to the surface of the third yoke 12 opposed to the above-mentioned third coil 14.

Further, the fourth yoke 15 is provided so as to sandwich the leg portion of the coil holder 5 on which the fourth coil 17 is wound. A fourth magnet 16 is secured to the surface of the fourth yoke 15 opposed to the above-mentioned fourth coil 17.

In this case, in each yoke (6, 9, 12, 15), the distance between the magnet secured in place and the surface opposed to this magnet is set so as to leave a predetermined gap with respect to the corresponding leg portion to be sandwiched by each yoke.

Further, as shown in FIGS. 6 and 7, the length of each yoke in the Z-axis direction is set such that the portion of the yoke to which the magnet is secured covers the entire back surface of the magnet so as to form a closed magnetic path.

As will be appreciated by referring to the sectional views of FIGS. 6 and 7, each yoke is secured in place so as to be arranged along the outer frame of a U-shaped positioning portion formed with respect to the base 4. That is, positioning is performed on the basis of the formation position of the positioning portion in the base 4 so that each yoke is arranged at a position where it can sandwich the corresponding leg portion of the coil holder 5 as described above.

According to the configuration of each of the pairs of [first yoke 6 and first magnet 7], [second yoke 9 and the second magnet 10], [third yoke 12 and third magnet 13] and [fourth yoke 15 and fourth magnet 16], when driving current is passed through each of the first coil 8, second coil 11, third coil 14, and fourth coil 17, a magnetic path for generating a driving force for moving the coil holder 5 in the Z-axis direction is formed.

Figure 8:
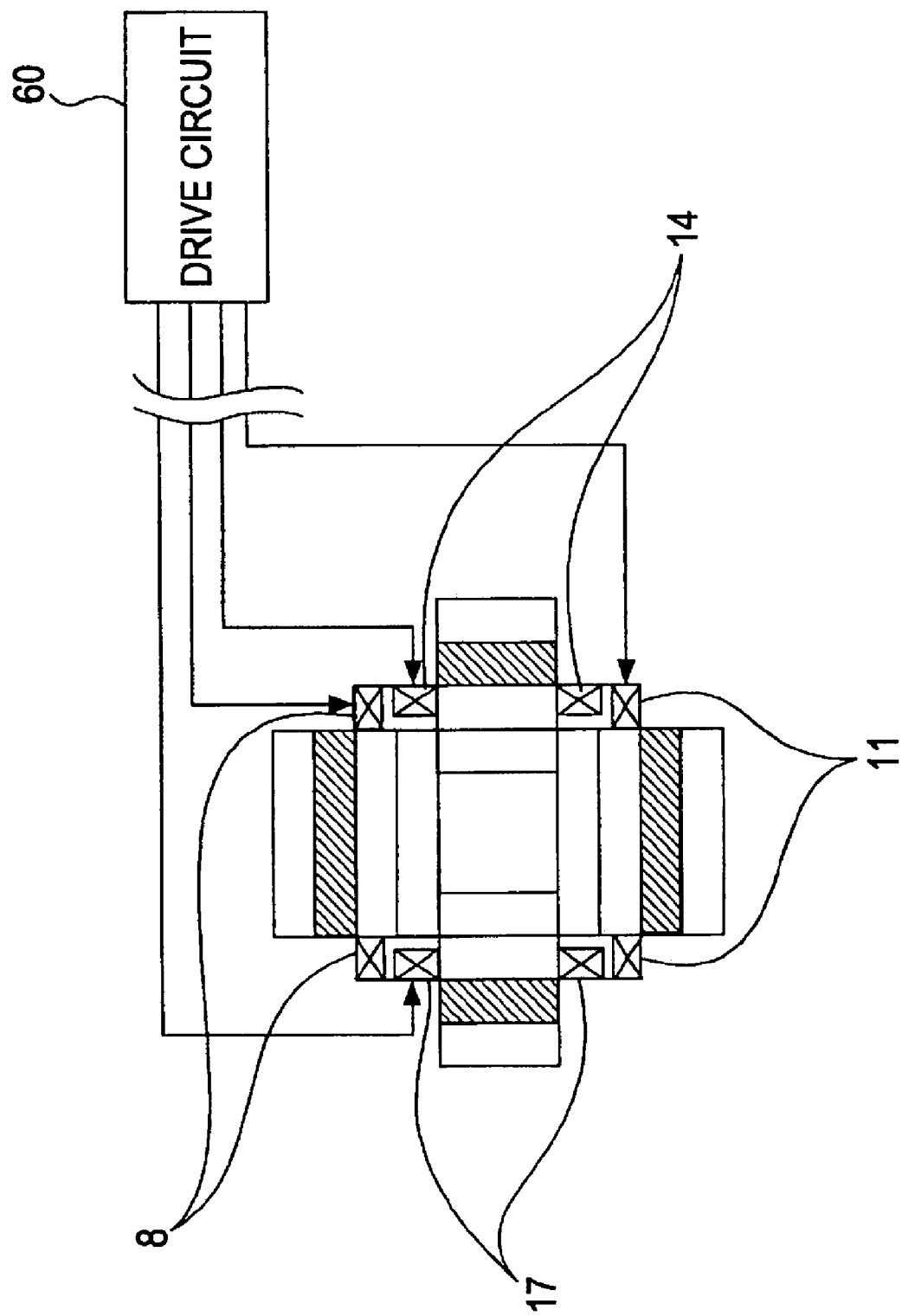
FIG. 8 is a diagram showing the configuration for supplying driving electric power to the deformable mirror device according to the first embodiment.

In this case, although not shown in FIGS. 5 to 7, as shown in FIG. 8, driving current is independently supplied from the drive circuit 60 shown in FIG. 1 mentioned above to each of the first coil 8, second coil 11, third coil 14, and fourth coil 17 wound on the coil holder 5 as mentioned above.

It should be noted that of the respective components of the deformable mirror device shown in FIG. 5 mentioned above, only the first coil 8, second coil 1, third coil 14, and fourth coil 17 are shown in FIG. 8 and the other portions are omitted from the drawing.

Referring to FIG. 8, the drive circuit 60 is configured to supply driving current independently to each of the first coil 8, second coil 11, third coil 14, and fourth coil 17 as shown in the drawing, on the basis of a value designated for each of the coils from a control circuit (not shown) provided in the optical disc apparatus shown in FIG. 1.

In this case, the wiring leading to the drive circuit 60 is connected to each of the coils as shown in the drawing, thereby making it possible to supply driving current independently to each of the coils.

Next, with reference to FIGS. 9, 10, and 11, description will be given of how the deformable mirror device 1 according to the first embodiment constructed as described above is deformed.

Figure 9:
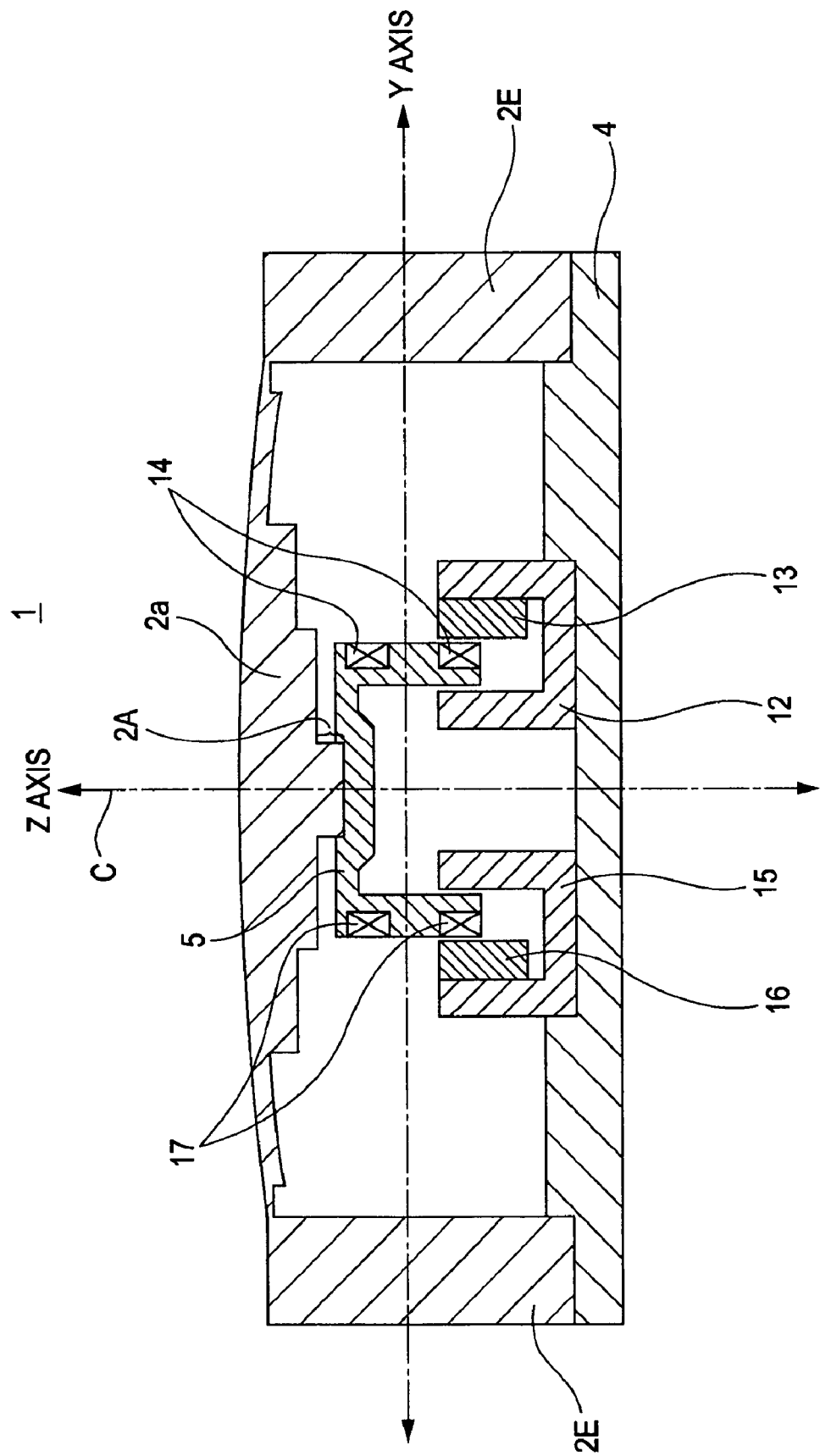
FIG. 9 is a view illustrating a deforming action in the case where driving currents of the same level are supplied to respective coils, as the deforming action of the deformable mirror device according to the first embodiment.
Figure 10:
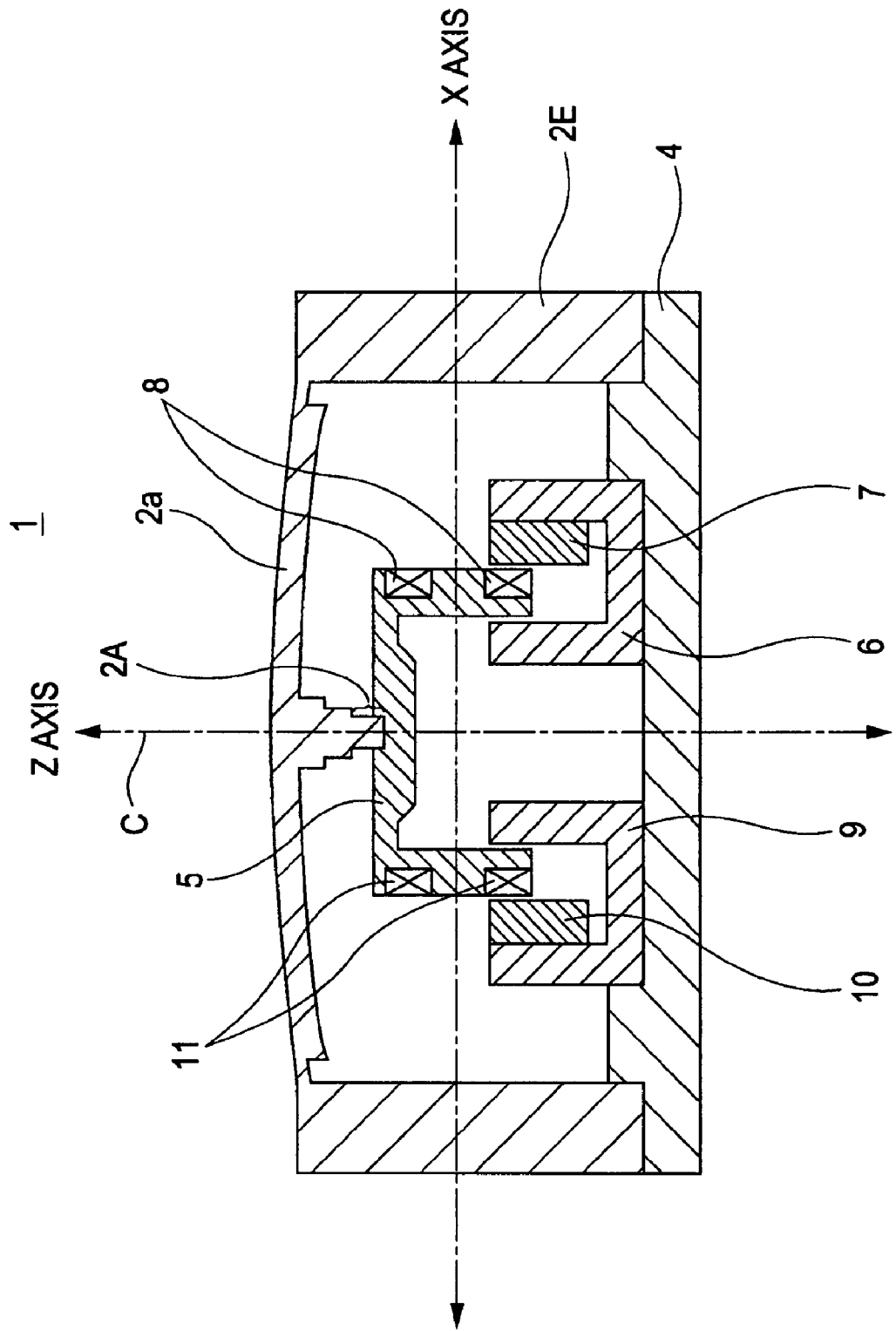
FIG. 10 is a view illustrating a deforming action in the case where driving currents of the same level are supplied to the respective coils, as the deforming action of the deformable mirror device according to the first embodiment.
Figure 11:
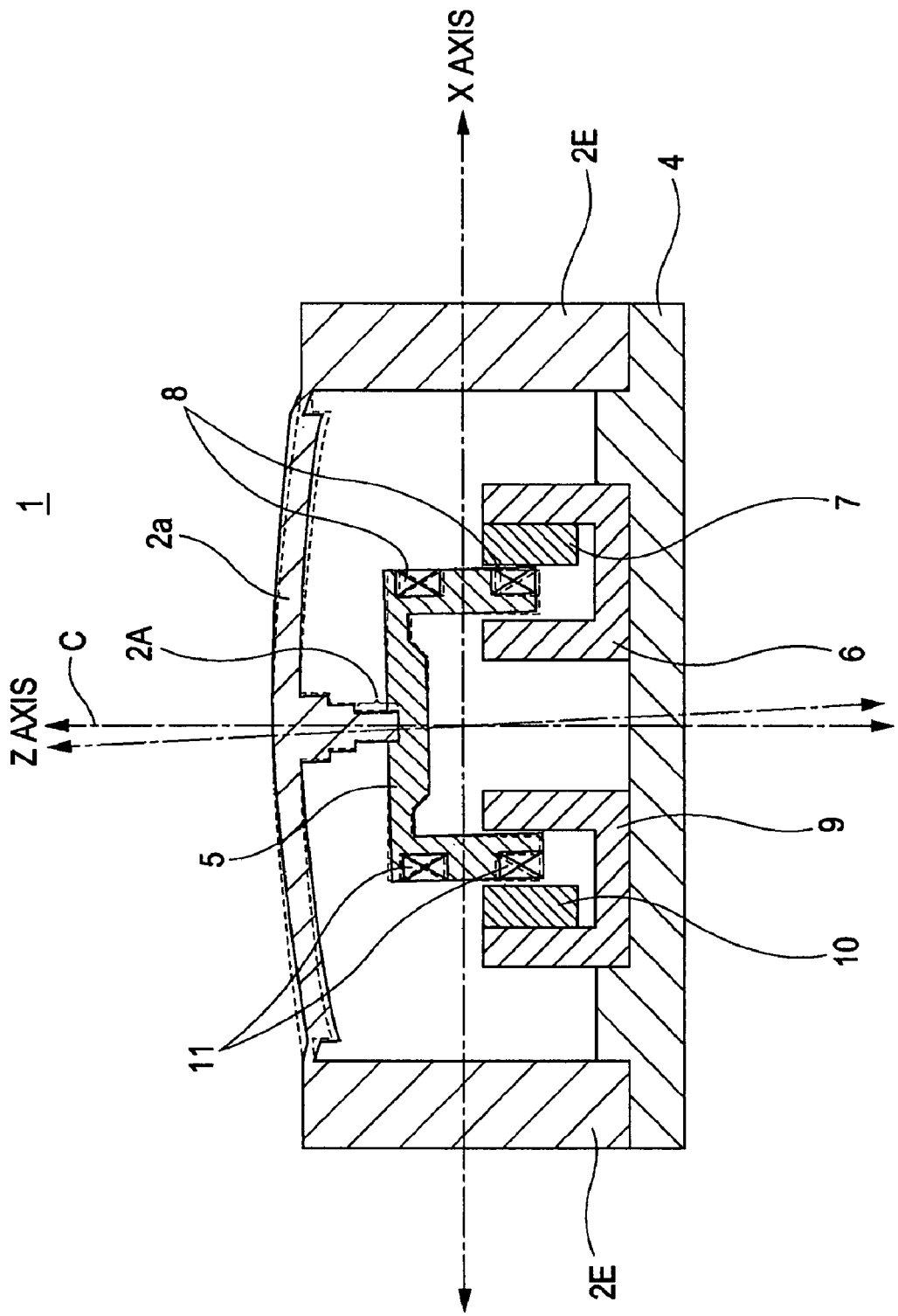
FIG. 11 is a view showing a deforming action when the balance of the levels of driving current supplied to the respective coils is changed, as the deforming action of the deformable mirror device according to the first embodiment.

It should be noted that like FIG. 6 mentioned above, FIG. 9 mentioned above is a sectional view of the deformable mirror device 1 taken along the Y-Z plane, and like FIG. 7, FIGS. 10 and 11 mentioned above are sectional views of the deformable mirror device 1 taken along the X-Z plane.

First, FIGS. 9 and 10 show the operation when driving current of the same level is supplied to each of the first coil 8, second coil 11, third coil 14, and fourth coil 17 by the drive circuit 60.

When driving current of the same level is supplied to each of the coils in this way, driving force causing movement in the Z-axis direction equally acts on each leg portion of the coil holder 5, so the coil holder 5 is moved in the Z-axis direction (that is, straightly upward direction).

Accordingly, uniform pressing force acting in the Z-axis direction is applied to the center portion of the flexible member 2 whose elliptical portion 2A is fitted and secured to the above-mentioned coil holder 5. In response to this, as shown in the drawing, the flexible member 2 is deformed in a convex shape so as to warp with its center portion as the vertex.

In this regard, as described above, the strength distribution pattern 2a is formed with respect to the flexible member 2. Accordingly, when a uniform pressing force is applied to the center portion of the flexible member 2 as mentioned above, a predetermined deformation profile corresponding to the strength distribution is obtained. That is, the deformation profile of the flexible member 2 obtained in response to the uniform application of pressure as mentioned above can be determined on the basis of the formation pattern of the strength distribution pattern 2a.

Accordingly, depending on the formation pattern of the above-mentioned strength distribution pattern 2a, the deformation profile of the flexible member 2 obtained in response to the uniform application of pressing force to the center portion as mentioned above can be set to be a predetermined profile allowing correction of the spherical aberration produced at the time of focusing onto the second recording layer 102. That is, the mirror surface can be deformed so as to enable correction of the spherical aberration produced at the time of focusing onto the second recording layer 102.

Further, according to the configuration of the deformable mirror device 1 as described above, the level of the pressure in the Z-axis direction to be applied to the flexible member 2 can be changed in accordance with the level of the driving current supplied to each of the coils. That is, the level of the pressure to be applied to the flexible member 2 can be changed stepwise by controlling the level of the driving current supplied to each of the coils.

Further, according to the configuration of the flexible member 2 as mentioned above, depending on the way the above-mentioned strength distribution pattern 2a is formed, a predetermined deformation profile that varies stepwise can be obtained in accordance with the pressure applied in the Z-axis direction that is changed stepwise in this way. That is, according to the configuration of the flexible member 2 as described above, a plurality of predetermined deformation behaviors can be obtained in accordance with the level of the driving current supplied to each of the coils (that is, the level of the pressure applied to the flexible member 2).

Accordingly, even when more than three recording layers are provided, correction of spherical aberration can be effectively performed in correspondence with the third and fourth recording layers, for example.

It should be noted that the formation pattern of the strength distribution pattern 2a of the flexible member 2 to be set in obtaining a predetermined deformation profile of the mirror surface, can be computed on the basis of results of a simulated deformation profile obtained in accordance with the pressure applied to the flexible member 2 by using, for example, the FEM (Finite Element Method) simulation tool or the like.

Further, on the other hand, according to the configuration of the drive circuit 60 and deformable mirror device 1 described above, it is also possible to supply driving currents of different levels to the respective coils.

This allows the balance of the levels of driving current supplied to the respective coils to be changed, thereby making it possible to change the balance of driving forces in the Z-axis direction to be applied to the four leg surfaces in the periphery of the coil holder 5. That is, due to the balance of driving forces (driving currents) as described above, the pressure to be applied to the flexible member 2 can be generated with its direction made variable.

If the pressure to be applied to the flexible member 2 can be thus generated with its direction made variable, it is also possible to drive the coil holder 5 so as to push it upward in a direction shifted from the Z-axis direction.

FIG. 11 shows the deformation of the mirror surface when changing the balance of the levels of driving current supplied to the respective coils as mentioned above.

FIG. 11 shows an operation in the case where the driving current level of the second coil 11 is set lower than the driving current levels of the first coil 8, third coil 14, and fourth coil 17.

When only the driving current level of the second coil 11 is set low relative to those of the other coils in this way, the coil holder 5 as a whole is driven so as to be moved in a direction for pushing the flexible member 2 upward, with the side of the coil holder 5 on which the second coil 11 is wound being tilted as shown in the drawing. Accordingly, a pressure to be applied to the flexible member 2 is also applied in a direction shifted from the Z-axis direction to the side where the second coil 11 is wound.

If a pressure can be applied to the flexible member 2 in a direction shifted from the Z-axis direction in this way, a mirror surface deformation profile having a point shifted from the center point at its vertex can be obtained in correspondence with an off-axis aberration.

Accordingly, the deformable mirror device 1 according to this embodiment also makes it possible to perform correction with respect to an off-axis aberration.

In this regard, in this embodiment, since there is no need to perform spherical aberration correction when focusing onto the first recording layer 101 as described above, correction needs only to be performed with respect to an off-axis aberration. That is, when focusing onto the first recording layer 101, driving current is supplied to each coil so that a pressure is applied to the flexible member 2, in which the strength distribution pattern 2a for spherical aberration correction is set, in an amount/pressure-application-direction shift amount that makes the deformation profile of the mirror surface become a profile required for correcting a target off-axis aberration.

In this way, when focusing onto the first recording layer 101, the balance of the levels of driving current supplied to the respective coils, and the levels of driving current themselves are controlled so that a mirror surface deformation profile required for correcting an off-axis aberration is obtained, thereby allowing correction to be performed with respect to a target off-axis aberration.

Further, when focusing onto the second recording layer 102 for which spherical aberration correction is required, while maintaining the balance of the driving current levels for the respective coils set at the time of focusing onto the first recording layer 101 as mentioned above, the individual driving current levels are raised to thereby raise the overall level by a predetermined value.

This allows the amount of pressure acting in the Z-axis direction to be increased by a predetermined value while maintaining the direction in which pressure is applied to the center portion of the flexible member 2 as it is.

If the amount of pressure acting in the Z-axis direction can be raised by a predetermined value, the flexible member 2, in which the strength distribution pattern 2a is set as described above, is deformed into a profile required for spherical aberration correction as a whole. Furthermore, in this case, shifting of the vertex position required for the correction of an off-axis aberration is performed. As a result, when focusing onto the second recording layer 102, correction of a target off-axis aberration can be also performed in addition to spherical surface correction.

Further, in the case where third and fourth recording layers of different cover thicknesses are present, likewise, while maintaining the balance of the driving current levels for the respective coils set so as to allow correction of a target off-axis aberration, the driving current levels of the individual coils are raised to achieve a stepwise rise in overall level, thereby making it possible to perform spherical aberration correction and off-axis aberration correction when focusing onto each recording layer.

In this way, with the deformable mirror device 1 according to this embodiment, with respect to the flexible member 2 including, as the strength distribution pattern 2a, predetermined patterns corresponding to the portions that are made to differ in their state in terms of deformation behavior is applied to the flexible member 2 to deform the mirror surface. Accordingly, to obtain a mirror surface deformation profile that enables spherical aberration correction, it suffices to apply a pressure only with respect to a predetermined location on the flexible member 2.

Accordingly, in obtaining a mirror surface deformation profile that enables spherical aberration correction, it is unnecessary to adopt a configuration according to the related art in which, for example, a plurality of locations on the flexible member are driven by means of a plurality of piezoelectric actuators.

In this regard, as will be appreciated from the above description made with reference to FIGS. 5 to 8, only one actuator formed by the coil folder 5 having individual coils wound on its different surfaces, and at least two yoke/magnet pairs for forming magnetic circuits with respect to those coils, may serve as the drive actuator used in the embodiment. Further, with respect to such an actuator, spherical aberration correction can be performed by deforming the flexible member 2 while controlling the levels of driving current supplied to the respective coils by the drive circuit 60.

In this way, the deformable mirror device 1 according to the first embodiment makes it possible to perform spherical aberration correction by means of simple arrangement and easy control.

Since the deformable mirror device 1 according to the first embodiment is configured such that driving currents can be independently supplied to at least two coils wound around on the coil holder 5 as mentioned above, a pressure to be applied to the flexible member 2 can be generated with its application direction made variable.

This allows a pressure to be applied to the flexible member 2 also in a direction shifted from the Z-axis direction. As a result, a correction can be performed also with respect to an off-axis aberration in addition to a spherical aberration.

Further, as described above, according to this embodiment, while maintaining a predetermined balance with respect to (the ratio of) the levels of driving current to be supplied to the respective coils wound around the coil holder 5, the respective driving current levels themselves are controlled so as to be changed stepwise. Therefore, even when more than three recording layers are formed, a mirror surface profile required for spherical aberration correction/off-axis aberration correction in each of the layers can be obtained in a stepwise fashion.

That is, even when more than three recording layers are formed, aberration correction can be effectively performed in all of the recording layers other than the recording layer serving as a reference in the design of the optical system.

Further, as for the manufacturing process for the deformable mirror device 1 according to this embodiment constructed as described above, the deformable mirror device 1 can be manufactured by using the semiconductor manufacturing process such as film coating, etching, or joining (fixing). This allows high-precision and high-volume production to be performed relatively easily. Further, since the semiconductor manufacturing process can be utilized, the size of the deformable mirror device 1 can be reduced, thereby making it possible to keep the manufacturing cost relatively low.

The electromagnetically-driven actuator equipped in the deformable mirror device 1 according to the first embodiment is configured such that the driving response of the coil holder 5 in response to the supply of driving current to each coil is relatively fast, thus enabling relatively high-speed drive on the order of, for example, several tens kHz.

This also enables an increase in the speed of responsiveness of deformation of the mirror surface, thereby making it possible to provide a deformable mirror device that can effectively perform correction even in such a case where correction of a target aberration is performed by following up changes in cover thickness occurring within one revolution of the disc 100, for example.

In this regard, at present, high-density discs such as the Blu-ray Disc are manufactured so that variations in cover thickness within such a disc are suppressed with good precision to a degree that makes a spherical aberration within one revolution of the disc negligible. However, if low-precision or so-called inferior-quality discs are put into circulation as the use of high-density discs becomes increasingly commonplace, it is conceivable that cover thickness variations become so large that the amount of spherical aberration within one disc revolution can no longer be ignored.

To cope with such a situation, it may be possible to correct a spherical aberration occurring within one revolution of the disc 1 to thereby prevent a decrease in recording/reproduction performance. However, since some of the recent high-density discs also feature higher disc rotation speed, it is also necessary to make the speed of deformation of the mirror surface relatively high.

Therefore, according to this embodiment that can make the speed of deformation of the mirror surface relatively high as mentioned above, it is possible to provide a deformable mirror device that makes it possible to effectively perform aberration correction adapted to cover thickness variations occurring within one revolution of the disc 1.

If aberration corrections adapted to cover thickness variations occurring within one revolution of the disc 1 can be effectively performed, it is possible to prevent degradation of recording/reproduction performance even with respect to inferior-quality discs. This translates to a greater tolerance for variations in the cover thickness of discs in comparison to the related art, thereby making it also possible to achieve a reduction in the manufacturing cost of the optical disc 100.

Although not illustrated in the drawings, to reduce the amount of deformation, it is also possible to configure the optical system such that the amount of spherical aberration becomes minimum when focusing at exactly the intermediate position between the first recording layer 101 and the second recording layer 102.

In this case, aberration correction is performed both at the time of focusing onto the first recording layer 101 and on the second recording layer 102. At this time, when focusing onto the second recording layer 102 located at the greatest distance from the recording surface, the mirror surface may be simply deformed in a convex shape as described above. However, when focusing onto the first recording layer 101 in this case, it is necessary to deform the mirror surface in reverse, that is, in a concave shape.

To deform the mirror surface in a concave shape as described above, the polarity of the driving current supplied to each of the coils wound around the coil holder 5 may be reversed. This allows spherical aberration correction and off-axis aberration correction to be performed in the same manner as described above.

It should be noted that also in the case where the amount of spherical aberration is set to become minimum at the time of focusing onto the second recording layer 102, the mirror surface is to be deformed in a concave shape at the time of focusing onto the first recording layer 101. In this case as well, aberration correction can be performed in the same manner by reversing the polarity of the driving current.

Second Embodiment

Next, description will be given of the deformable mirror device 20 according to the second embodiment of the present invention.

Figure 12:
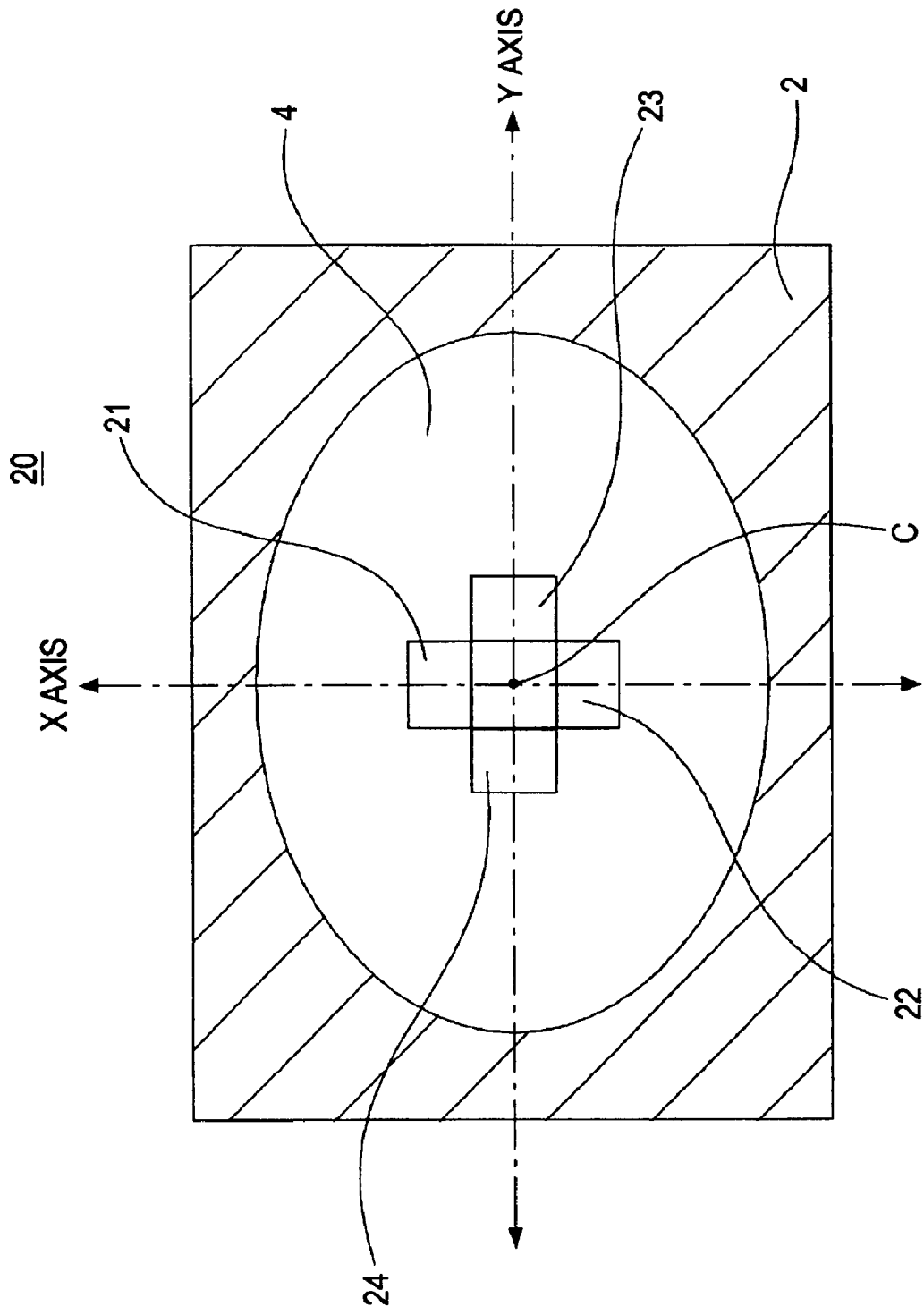
FIG. 12 is a sectional view showing the internal configuration of a deformable mirror device according to a second embodiment of the present invention.
Figure 13:
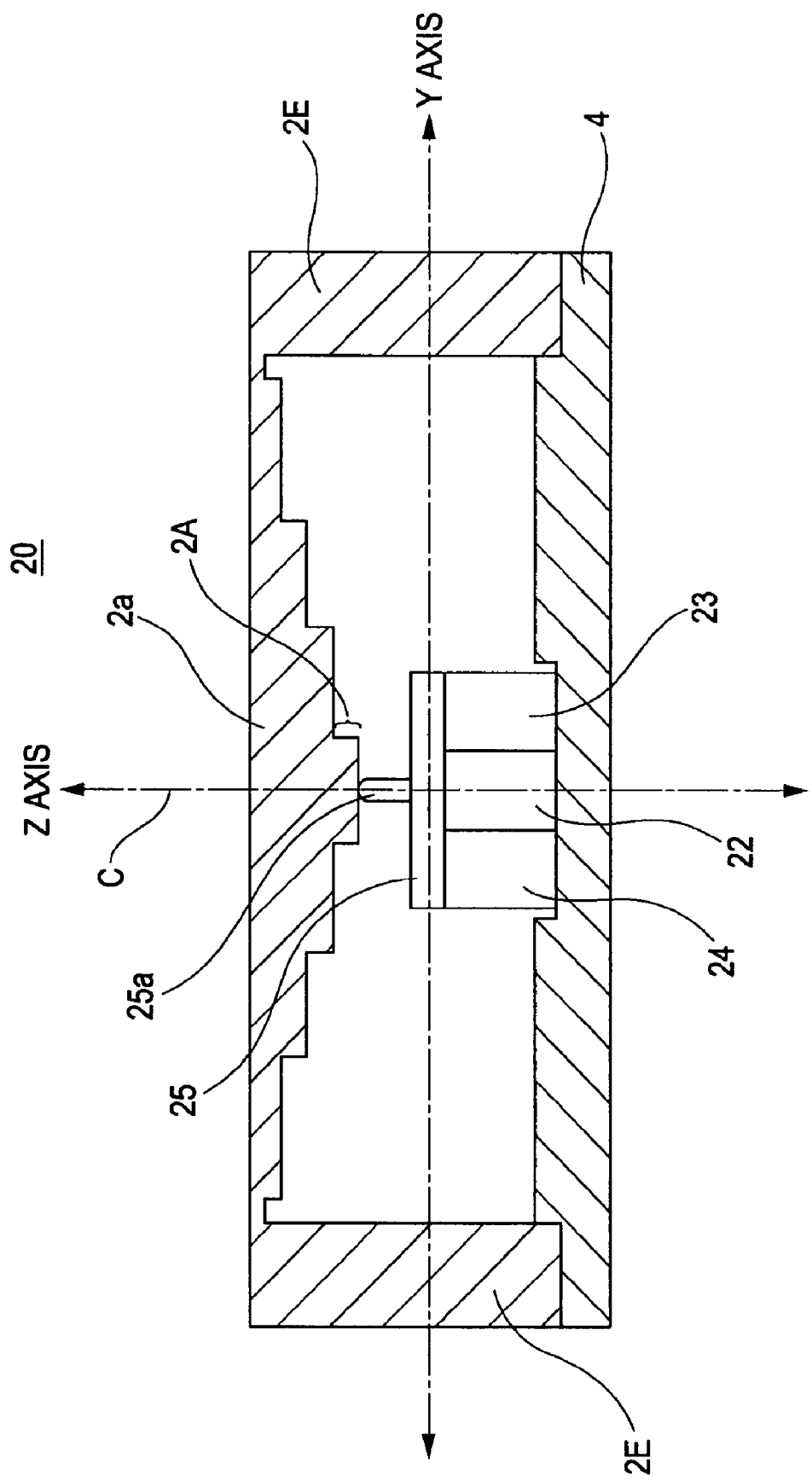
FIG. 13 is a sectional view showing the internal configuration of the deformable mirror device according to the second embodiment.
Figure 14:
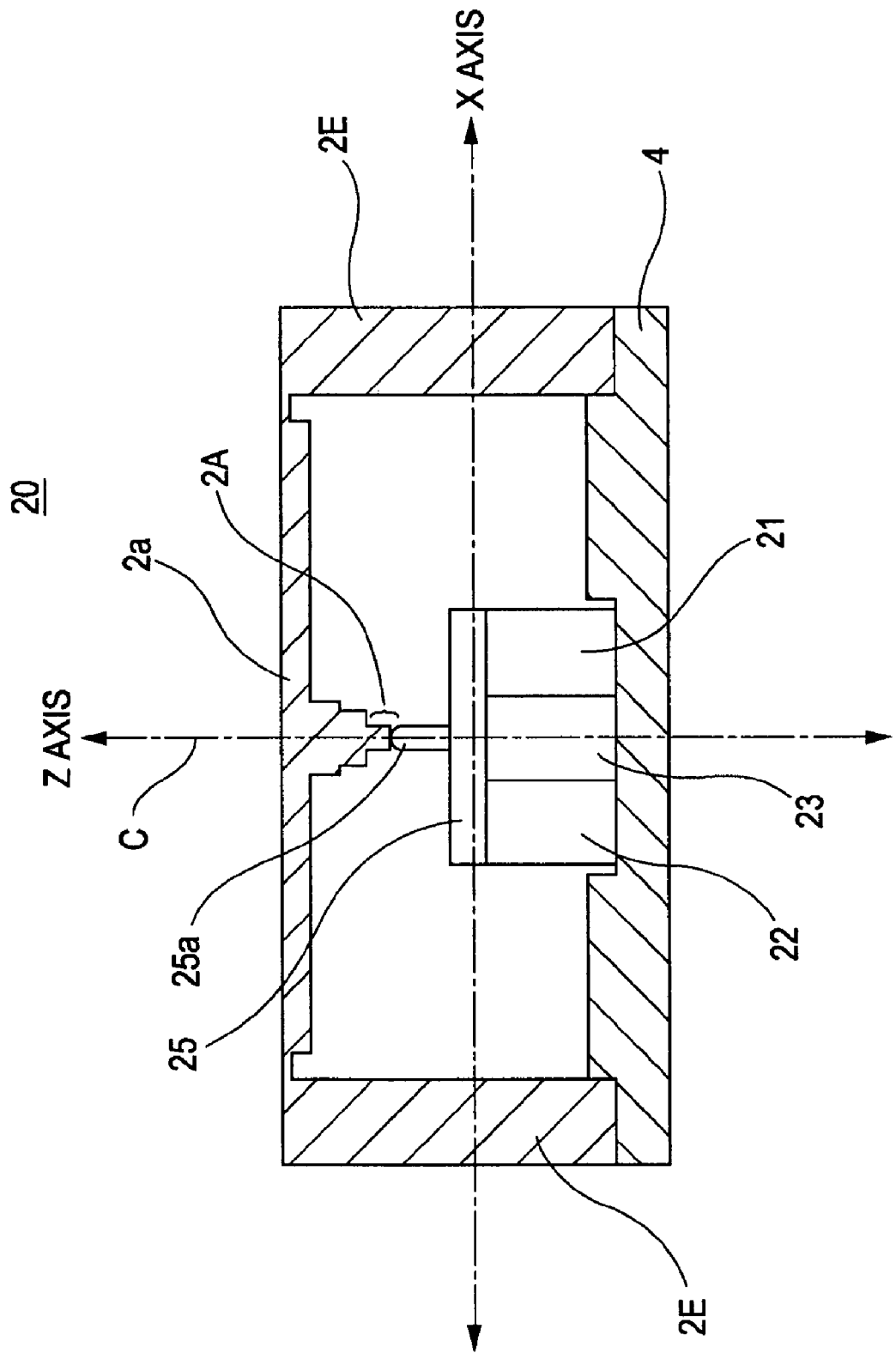
FIG. 14 is a sectional view showing the internal configuration of the deformable mirror device according to the second embodiment.

FIGS. 12, 13, and 14 are sectional views showing the internal structure of the deformable mirror device 20. FIG. 12 is a sectional view of the deformable mirror device 20 taken along the X-Y plane defined by the X axis and the Y axis shown in FIG. 1, FIG. 13 is a sectional view of the same taken along the Y-Z plane defined by the Y axis and the Z axis shown in FIG. 1, and FIG. 14 is a sectional view of the same taken along the X-Z plane defined by the X axis and the Z axis shown in FIG. 1.

It should be noted that in the description of the second embodiment, the portions that have already been described with reference to the first embodiment are denoted by the same reference numerals and description thereof is omitted.

The deformable mirror device 20 according to the second embodiment includes an actuator using piezoelectric elements as the actuator for applying a pressure to the flexible member 2.

First, as shown in FIGS. 12 and 13, the deformable mirror device 20 includes a first piezoelectric element 21, a second piezoelectric element 22, a third piezoelectric element 23, and a fourth piezoelectric element 24. Each of these piezoelectric elements is shaped like a square pole. As will be appreciated by referring to the X-Y sectional view of FIG. 12 in particular, the first piezoelectric element 21 and the second piezoelectric element 22 are provided at symmetrical positions with reference to the center C in the X-axis direction. Likewise, the third piezoelectric element 23 and the fourth piezoelectric element 24 are provided at symmetrical positions with reference to the center C in the Y-axis direction.

In this case, a predetermined spacing is provided between the first piezoelectric element 21 and the second piezoelectric element 22, and between the third piezoelectric element 23 and the fourth piezoelectric element 24. Accordingly, the outer peripheral configuration of the piezoelectric elements 21 to 24 as seen in the X-Y section becomes substantially cross-shaped as shown in the drawing.

The first to fourth piezoelectric elements 21 to 24 are subjected to positioning in a cross-shaped recessed portion formed in the base 4 and then secured to the base 4 (see FIGS. 13 and 14).

Further, as shown in FIGS. 13 and 14, a pressing member 25 is secured to the surfaces of the first to fourth piezoelectric elements 21 to 24 opposite to the surfaces to which the above-mentioned base 4 is secured. Although not shown, the shape of the pressing member 25 in the X-Y section is also cross-shaped so as to conform to the cross-shape of the X-Y section of the first to fourth piezoelectric elements 21 to 24.

A bar-shaped portion 25a is formed in the pressing member 25 so as to project form the center portion of its cross shape. As shown in the drawing, the bar-shaped portion 25a has a semi-spherical distal end. This semi-spherical distal end portion is made to abut on the flexible member 2 on the axis of the center C of the mirror surface. In other words, the semi-spherical distal end portion is made to abut on the center of the elliptical portion 2A.

It should be noted that since the distal end portion of the bar-shaped portion 25a is formed in a semi-spherical shape as mentioned above, as compared with a case where it is formed in a square shape, for example, a greater strength can be secured as the strength of the abutting portion of the bar-shaped portion 25a at the time of application of a pressure to the flexible member 2 which will be described later (in particular, at the time of application of a pressure in a diagonal direction).

Each of the piezoelectric elements (21 to 24) is a so-called stacked-type piezoelectric element and has a structure in which plate-shaped piezoelectric and electrode plates are alternately stacked on top of each other. In this case, in each piezoelectric element, electrode plates that are to become positive terminals and electrode plates that are to become negative terminals are respectively connected in parallel. Upon application of driving voltage, each of the piezoelectric plates sandwiched between the respective electrode plates uniformly expand in the Z-axis direction. That is, in each piezoelectric element, a predetermined amount of expansion is obtained as a whole in response to the application of driving voltage of a predetermined level.

Figure 15:
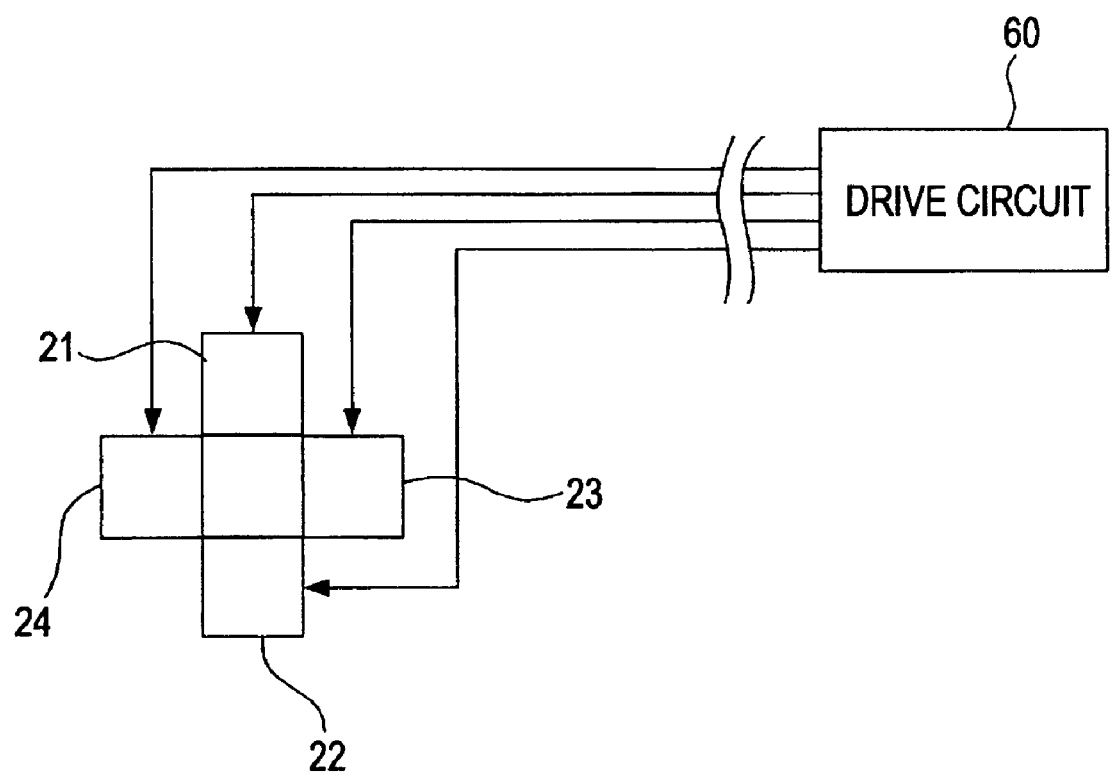
FIG. 15 is a diagram showing the configuration for supplying driving electric power to the deformable mirror device according to the second embodiment.

Further, as shown in FIG. 15, the second embodiment is also configured such that driving voltage can be independently applied to each of the piezoelectric elements that expand in the Z-axis direction in this way.

It should be noted that FIG. 15 shows, from among the respective components of the deformable mirror device 20, only the first piezoelectric element 21, the second piezoelectric element 22, the third piezoelectric element, and the fourth piezoelectric element 24, and the drive circuit 60 shown in FIG. 1.

In FIG. 15, the drive circuit 60 in this case is configured to apply driving voltage independently to each of the first piezoelectric element 21, second piezoelectric element 22, third piezoelectric element 23, and fourth piezoelectric element 24 as shown in the drawing, on the basis of a value designated for each of the piezoelectric elements from the above-mentioned control circuit (not shown) provided in the optical disc apparatus.

In this case as well, as shown in the drawing, the wiring leading to the drive circuit 60 is connected to each of the piezoelectric elements (more precisely, electrode plates respectively connected in parallel), thereby making it possible to supply (apply) driving voltage independently to each of the piezoelectric elements.

Figure 16:
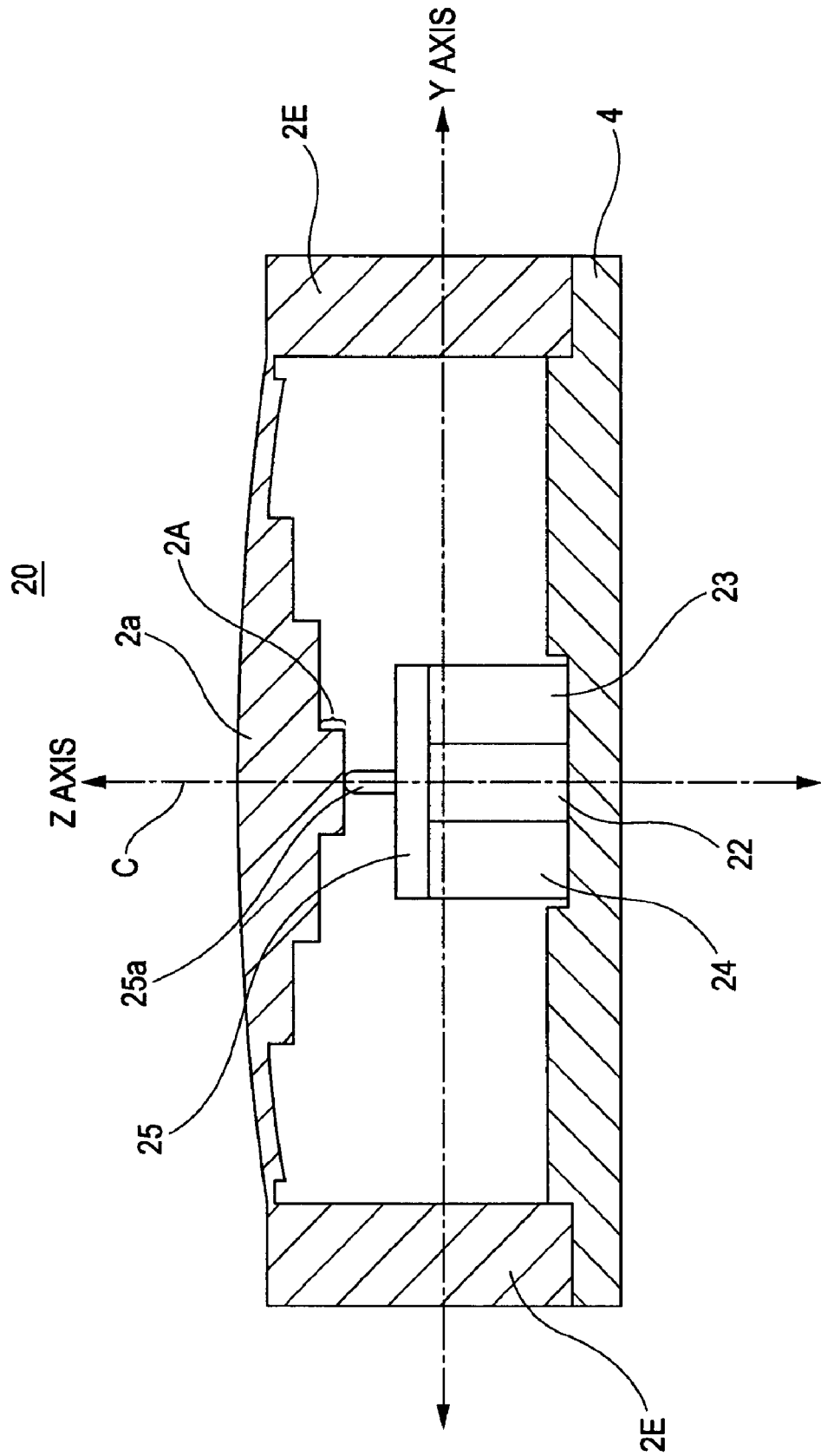
FIG. 16 is a view illustrating a deforming action in the case where driving voltages of the same level are supplied to respective piezoelectric elements, as the deforming action of the deformable mirror device according to the second embodiment.
Figure 17:
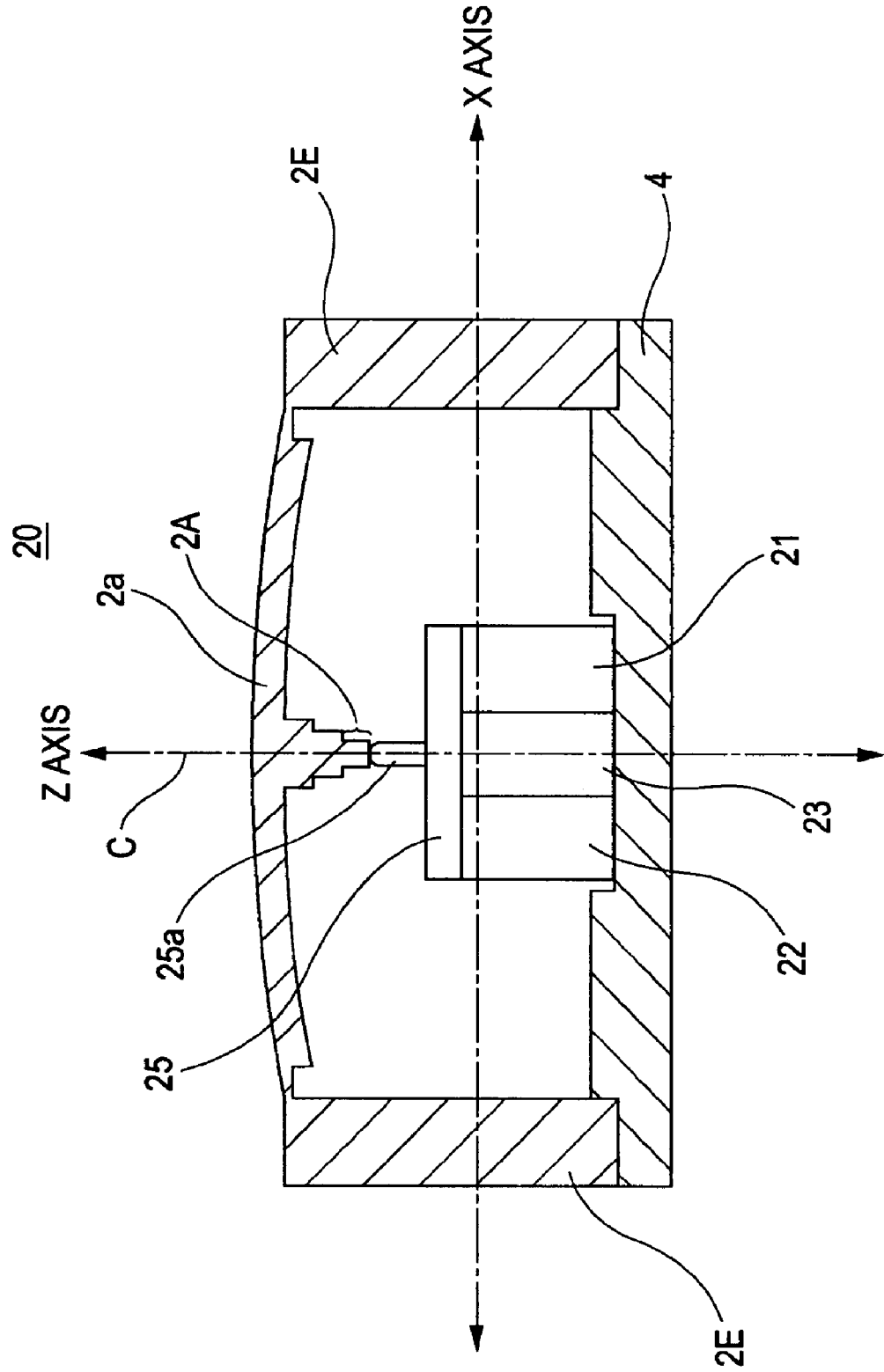
FIG. 17 is a view illustrating a deforming action in the case where driving voltages of the same level are supplied to the respective piezoelectric elements, as the deforming action of the deformable mirror device according to the second embodiment.

FIGS. 16 and 17 show the deformation of the deformable mirror device 20 configured as mentioned above.

Like FIG. 13 mentioned above, FIG. 16 is a sectional view of the deformable mirror device 20 taken along the Y-Z plane, and like FIG. 14 mentioned above, FIG. 17 is a sectional view of the deformable mirror device 20 taken along the X-Z plane.

FIGS. 16 and 17 show the operation when driving voltages of the same level are applied to the first piezoelectric element 21, the second piezoelectric element 22, the third piezoelectric element 23, and the fourth piezoelectric element 24 by the drive circuit 60.

In this case as well, by applying driving voltages of the same level to the respective piezoelectric elements, the respective piezoelectric elements are expanded by the same amount in the Z-axis direction, thereby making it possible to apply a pressing force acting in the Z-axis direction to the flexible member 2.

That is, in this case, as the respective piezoelectric elements expand by the same amount in the Z-axis direction, the pressing member 25 secured to the respective piezoelectric elements is driven so as to move in the Z-axis direction. Accordingly, the bar-shaped portion 25a applies a pressure in such a way as to press the center C of the flexible member 2, thereby causing the mirror surface to deform in a convex shape with the center C as the vertex.

At this time, the strength distribution pattern 2a of the flexible member 2 is set such that a mirror surface deformation profile that makes it possible to correct spherical aberration occurring at the time of focusing onto the second recording layer 102 can be obtained in response to the application of a predetermined pressure in the Z-axis direction by the bar-shaped portion 25a as described above. Accordingly, in this case as well, spherical aberration correction can be performed when focusing onto the second recording layer 102.

Further, in this case as well, the drive circuit 60 can apply driving voltage to each of the piezoelectric elements with its level being made variable in a stepwise manner, thereby making it possible to change the amount of expansion of each piezoelectric element in the Z-axis direction in a stepwise manner. Further, in this case as well, there is formed, as the strength distribution pattern 2a, a pattern that allows spherical aberration correction to be performed in each recording layer in accordance with the amount of expansion (that is, the pressure in the Z-axis direction applied to the flexible member 2 by the bar-shaped portion 25a) of each piezoelectric element which is made variable in a stepwise manner in this way. Therefore, even when third and fourth recording layers of different cover thicknesses are formed, spherical aberration correction can be performed effectively in each of the recording layers.

Further, since the second embodiment is also configured such that driving voltage can be independently applied to each of the piezoelectric elements by the drive circuit 60 as described above, by changing the balance of the levels of driving voltage applied to the respective piezoelectric elements, the balance of driving forces in the Z-axis direction applied to a plurality of (in this case, four) locations on the pressing member 25 can be changed.

That is, in this case as well, a pressure to be applied to the flexible member 2 can be generated with its direction made variable.

Figure 18:
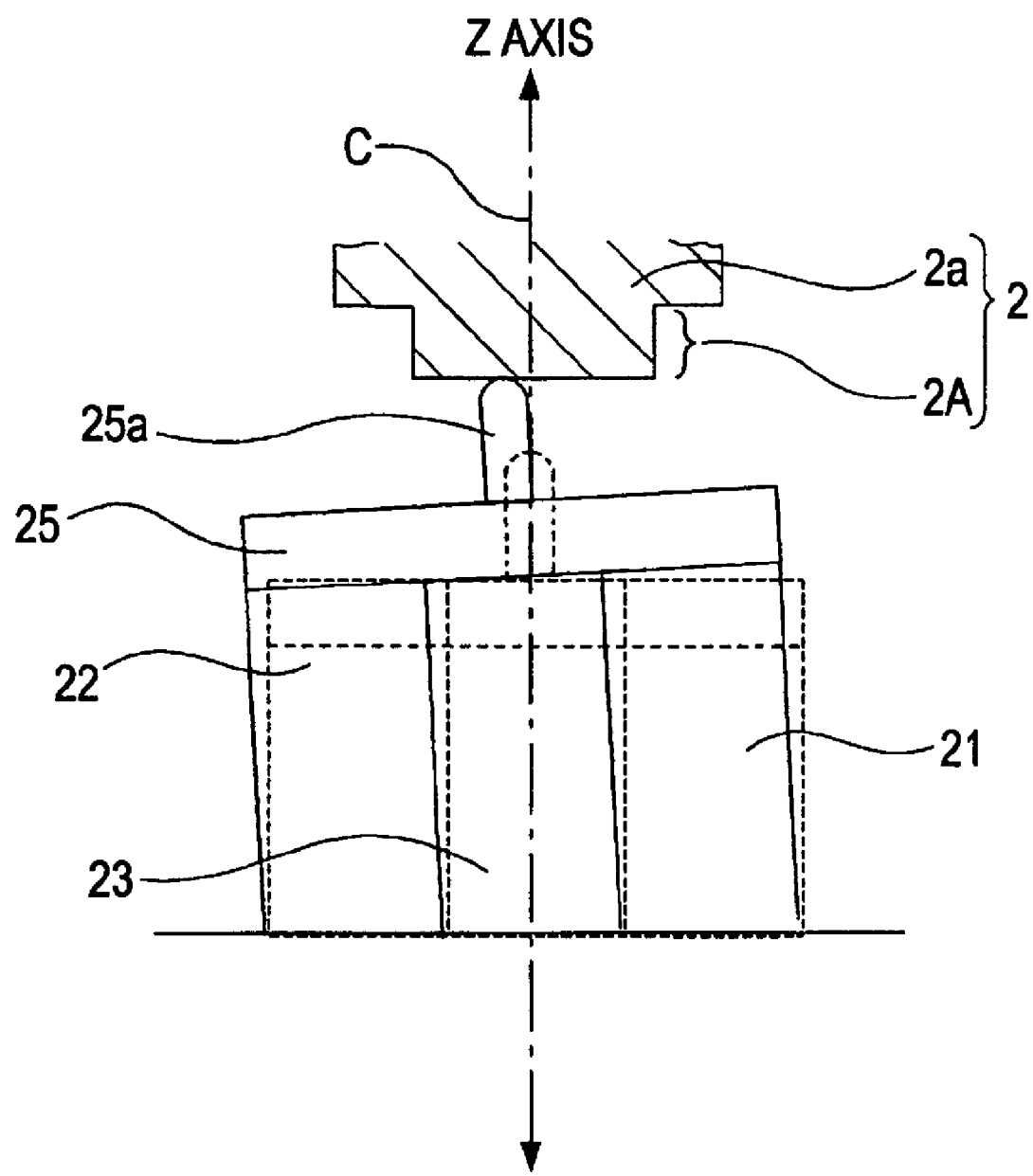
FIG. 18 is a view showing a deforming action when the balance of the levels of driving voltage supplied to the respective piezoelectric elements is changed, as the deforming action of the deformable mirror device according to the second embodiment.

FIG. 18 shows an operation obtained in the case where the balance of the levels of driving voltage applied to the respective piezoelectric elements is changed in this way. It should be noted that FIG. 18 showing the X-Z section of the deformable mirror device 20 depicts only the first piezoelectric element 21, the second piezoelectric element 22, the third piezoelectric element 23, the pressing member 25 (including the bar-shaped portion 25a), and the flexible member 2 (mainly the elliptical portion 2A).

FIG. 18 shows an operation in the case where the driving voltage level for the second piezoelectric element 22 is set lower than the driving voltage levels for the other piezoelectric elements, that is, the first piezoelectric element 21, the third piezoelectric element 23, and the fourth piezoelectric element 24.

When only the driving voltage level for the second piezoelectric element 22 is set low relative to those for the other piezoelectric elements in this way, the pressing member 25 as a whole is driven so as to be moved in the direction for pushing up the flexible member 2, with the side of the pressing member 25 to which the second piezoelectric element 22 is secured being tilted as shown in the drawing.

It should be noted, however, that in this case, unlike in first embodiment, the pressing member 25 serving as a pressure applying section (corresponding to the coil holder 5 in the first embodiment) that applies pressure to the flexible member 2 is not secured to the flexible member 2.

In this case, the pressing member 25 as the pressure applying section is driven while being tilted in a predetermined direction in this way. Accordingly, as will be appreciated from comparison with the case of applying a pressure in the Z-axis direction as described above with reference to FIGS. 16 and 17, the bar-shaped portion 25a is made to press a portion shifted from the center C.

If a pressure can be applied to the flexible member 2 at a position shifted from the center C in this way, in this case as well, a mirror surface deformation profile having a point shifted from the center point at its vertex can be obtained in correspondence with an off-axis aberration.

Accordingly, correction with respect to a predetermined off-axis aberration can be also performed with the deformable mirror device 20 according to the second embodiment.

In this case as well, since there is no need to perform spherical aberration correction when focusing onto the first recording layer 101, correction needs only to be performed with respect to an off-axis aberration. That is, when focusing onto the first recording layer 101, driving voltage is applied to each piezoelectric element so that a pressure is applied to the flexible member 2, in which the strength distribution pattern 2a for spherical aberration correction is set, in an amount/pressure-application-direction shift amount that makes the deformation profile of the mirror surface become a profile required for correcting a target off-axis aberration. That is, in this case as well, when focusing onto the first recording layer 101, the balance of the levels of driving voltage applied to the respective piezoelectric elements, and the levels of driving voltage themselves are controlled so that a mirror surface deformation profile required for correcting an off-axis aberration is obtained, thereby allowing correction to be performed with respect to a target off-axis aberration.

Further, when focusing onto the second recording layer 102 for which spherical aberration correction is required, while maintaining the balance of the driving voltage levels for the respective piezoelectric elements set at the time of focusing onto the first recording layer 101 as mentioned above, the individual driving voltage levels are raised to achieve an increase in overall level by a predetermined value.

This allows the amount of pressure acting in the Z-axis direction to be increased by a predetermined value while maintaining the pressure application position with respect to the flexible member 2 as it is. In accordance with the increase in the amount of pressure acting in the Z-axis direction by a predetermined value as described above, the profile of the mirror surface of the flexible member 2, in which the above-described strength distribution pattern 2a is set, can be deformed as a whole into a profile required for spherical aberration correction. That is, spherical aberration correction can be thus performed when focusing onto the second recording layer 102.

In this case as well, the balance of the respective driving voltages is maintained, and the vertex position of the mirror surface is shifted to a position allowing off-axis aberration correction as described above. Off-axis aberration correction can be thus performed in the same manner as when focusing onto the first recording layer 101 and, as a result, both spherical aberration correction and off-axis aberration correction can be performed when focusing onto the second recording layer 102.

Further, in this case as well, when third and fourth recording layers of different cover thicknesses are formed, while maintaining the balance of the driving voltage levels for the respective piezoelectric elements set so as to allow correction of a target off-axis aberration, the driving voltage levels of the individual piezoelectric elements are raised so as to achieve a stepwise increase in overall level, thereby making it possible to perform spherical aberration correction and off-axis aberration correction when focusing onto each recording layer.

According to the above description, the deformable mirror device 20 according to the second embodiment is also configured such that its mirror surface is deformed by applying a pressure to the flexible member 2 in which the strength distribution pattern 2a is formed. Accordingly, to obtain a mirror surface deformation profile that enables spherical aberration correction, it suffices to apply a pressure only with respect to a predetermined location on the flexible member 2. Accordingly, in obtaining a mirror surface deformation profile that enables spherical aberration correction, it is unnecessary to adopt a configuration according to the related art in which, for example, a plurality of locations on the flexible member are driven by means of a plurality of piezoelectric actuators.

In the second embodiment, one actuator formed by at least two piezoelectric elements, and the pressing member 25 to which the piezoelectric elements are secured and in which the bar-shaped portion 25a is formed, may serve as the actuator required for deforming the mirror surface. Further, spherical aberration correction can be performed by deforming the flexible member 2 while controlling the levels of driving voltage applied to the respective piezoelectric elements by the drive circuit 60.

Accordingly, in this case as well, spherical aberration correction can be performed by means of simple arrangement and easy control as in the first embodiment.

Since the deformable mirror device 20 according to the second embodiment is configured such that driving voltages are independently applied to at least two piezoelectric elements as mentioned above, a pressure to be applied to the flexible member 2 can be generated with its application direction made variable.

Accordingly, in the second embodiment as well, the mirror surface profile can be deformed so that a point shifted from the center point becomes the vertex position. As a result, correction can be also performed with respect to an off-axis aberration in addition to a spherical aberration.

Further, as described above, while maintaining a predetermined balance with respect to (the ratio of) the levels of driving voltage to be applied to the respective piezoelectric elements, the respective driving voltage levels themselves are controlled so as to be changed stepwise. Therefore, even when more than three recording layers are formed, a mirror surface profile required for spherical aberration correction/off-axis aberration correction in each of the layers can be obtained in a stepwise fashion. Accordingly, even when more than three recording layers are formed, aberration correction can be effectively performed in all of the recording layers other than the recording layer serving as a reference in the design of the optical system.

Further, as the manufacturing processing for the deformable mirror device 20 according to the second embodiment configured as described above, the deformable mirror device 20 can be also manufactured by using the semiconductor manufacturing process such as film coating, etching, or joining (fixing). This allows high-precision and high-volume production to be performed relatively easily. Further, since the semiconductor manufacturing process can be utilized, the size of the device can be reduced, thereby making it possible to keep the manufacturing cost relatively low.

The actuator using piezoelectric elements equipped in the deformable mirror device 20 according to the second embodiment is also configured such that the driving response of the pressing member 25 in response to the application of driving voltage is relatively fast. Therefore, the deformable mirror device 20 according to the second embodiment makes it possible to effectively perform aberration correction even in such a case where correction of a target aberration is performed by following up changes in cover thickness occurring within one revolution of the optical disc 100, for example.

<Modifications>

While the embodiments of the present invention have been described above, the present invention is not limited to the embodiments described above.

For example, the sectional profile of the flexible member in which the mirror surface is formed is not limited to the strength distribution pattern 2a shown in FIGS. 4A and 4B.

For example, in accordance with a case where the present invention is applied to a 90° mirror that reflects incident laser light at 180°, it is also possible to form the strength distribution pattern by circular shapes having the same center (that is, by concentric circular shapes).

Further, the thickness of the flexible member may not necessarily decrease in a stepwise fashion. The thin-walled portion (elliptical portion 2G) may not necessarily be provided, either.

Further, the strength distribution pattern may not necessarily be formed by the patterns of circular or elliptical shapes having the same center. The strength distribution pattern may be formed by other patterns as long as a deformation profile required for spherical aberration correction can be obtained.

It should be noted, however, that if the portions of the flexible member which differ in their state in terms of deformation behavior are formed by circular or elliptical shapes having the same center, it is possible to realize a deformable mirror device that allows spherical aberration correction to be performed in a satisfactory manner in each of a case where laser light is reflected at 90° and a case where laser light is reflected at 180°.

Further, by forming the portions differing in their state in terms of deformation behavior by circular or elliptical shapes having the same center in this way, it is possible to prevent local concentration of stress, which in turn makes it possible to effectively prevent cracking or fatigue fracture of the flexible member.

In this regard, upon application of a pressure for deforming the mirror surface, internal stress is generated in the flexible member. At this time, if there is a location on the flexible member where stress is locally concentrated, in the case where the flexible member is made of a homogeneous isotropic material as in the embodiment, a rapid dimensional change takes place at this location.

For example, when the formation pattern of the portions differing in their state are not concentric (not circles or ellipses having the same center), the interval between the respective patterns increase or decrease in a specific direction. The portion where this interval decreases corresponds to the location where stress is liable to concentrate as compared with other portions, and hence a rapid dimensional change occurs in response to the application of a uniform pressure.

If there is a portion where stress is concentrated as described above, there is a greater probability of the allowable stress of the flexible member being exceeded at this portion, which increases the probability of cracking. Further, the repeated deformations of the flexible member may lead to fatigue fracture at this portion.

Accordingly, by forming the patterns by circular or elliptical shapes having the same center as mentioned above, it is possible to achieve a uniform interval between the respective patterns and prevent stress from being locally concentrated, thereby effectively preventing the above-mentioned cracking or fatigue fracture.

While in the embodiment the portions of the flexible member which differ in state in terms of deformation behavior are formed by portions that differ in cross-sectional thickness, alternatively, portions that differ in state in terms of deformation behavior can also be formed by, for example, allowing a portion made of a different material to be mixed at a predetermined position of the flexible member.

However, in this case, it is necessary to form the flexible member such that, for example, a different material is contained in a predetermined position at a predetermined ratio, which adds complexity to the manufacturing process and may lead to an increase in manufacturing cost. In contrast, with the technique according to the embodiment in which portions that differ in cross-sectional thickness are formed, the flexible member can be formed of the same single material, and the strength distribution pattern can be formed by etching, which advantageously makes it possible to realize a corresponding reduction in cost.

Further, in the second embodiment, stacked type piezoelectric elements are used as the piezoelectric elements, and the piezoelectric elements are configured so that they can expand only in the Z-axis direction. However, it is also possible to use a so-called tube-type piezoelectric element to allow a pressure to be applied in the same manner with respect to the flexible member 2.

Such a tube-type piezoelectric element has a cylindrical shape, and is formed such that the lower half thereof can contract in the Z-axis direction, and the upper half thereof can tilt in an arbitrary direction on the X-Y plane. While in the embodiment four stacked-type piezoelectric elements are used to realize the generation of a pressure in an arbitrary direction, the use of such a tube-type piezoelectric element allows this to be realized by a single piezoelectric element.

Further, with respect to the electromagnetically-driven actuator according to the first embodiment, it is possible to adopt a configuration in which the coil holder 5 is not secured to the elliptical portion 2A of the flexible member 2, and instead the coil holder 5 is provided with a bar-shaped portion that projects toward the flexible member 2 to thereby perform the application of a pressure to the flexible member 2 as in the second embodiment.

Conversely, in the second embodiment, it is possible to adopt a configuration in which the pressing member 25 is secured to the elliptical portion 2A of the flexible member 2 to thereby perform the application of a pressure to the flexible member 2 as in the first embodiment. When the pressing member 25 is secured to the flexible member 2 side as in the first embodiment in this way, the flexible member 2 (mirror surface) can be deformed also in a concave shape by reversing the polarity of driving voltage applied to each piezoelectric element.

Further while in the embodiment the reflective film 3 serving as a mirror surface is formed only on the front surface of the flexible member 2, the reflective film 3 may also be formed on the back surface of the flexible member 2.

By thus forming the reflective film 3 also on the back surface to realize a sandwich structure of the reflective film 3/flexible member 2/reflective film 3, the internal stress generated in the flexible member 2 due to the formation of the reflective film 3 is balanced, thereby making it easier to control warping of the flexible member 2. That is, it can be made easier to ensure the flatness of the mirror surface in the non-deformed state.

However, in the case where the flexible member 2 is imparted with the strength distribution pattern 2a with varying sectional profiles, if reflective films 3 of the same material and same thickness are formed on the front and back sides of the flexible member 2, it is not possible to balance the internal stress. In view of this, in this case, the thickness of the reflective film 3 on the back surface is adjusted in accordance with the cross-sectional thickness of the strength distribution pattern 2a, or reflective films 3 of different materials are formed in correspondence with each different cross-sectional thickness of the strength distribution pattern 2a, thereby making it possible to balance the internal stress generated in the flexible member 2 due to the formation of the reflective film 3.

Further, the reflective film 3 may not necessarily be formed on the entire front surface of the flexible member 2. The same various effects that have been described above can be attained as long as the reflective film 3 is formed over a range covering at least the incident laser light spot.

Further, while the deformable mirror device according to an embodiment of the present invention is equipped to an optical disc apparatus that can handle high-recording-density discs such as a Blu-ray Disc, the deformable mirror device can be suitably applied to any optical disc apparatus that can handle other optical discs in which a plurality of recording layers are formed.

Further, the deformable mirror device can be suitably applied to even an optical disc apparatus including only one recording layer as long as the optical disc apparatus performs spherical aberration/off-axis aberration correction by following up variations in cover thickness occurring within one disc revolution.

As described above, the deformable mirror device according to an embodiment of the present invention enables off-axis aberration correction in addition to spherical aberration correction. Off-axis aberration correction can be thus performed by the 45° mirror (or 90° mirror) equipped to an optical pickup in the optical disc apparatus, which contributes to a reduction in the size and cost of the optical pickup.

For example, some optical disc apparatuses of the related art are adapted to handle a plurality of kinds of optical disc with respect to which signal recording/reproduction is performed using different numerical apertures/laser wavelengths, such as a CD (Compact Disc), a DVD (Digital Versatile Disc), and a Blu-ray Disc. In this case, since the laser light emission points corresponding to the individual optical discs are different from each other, the optical system is designed such that one of the laser light beams is properly incident on the objective lens. Accordingly, upon emitting laser light, the laser light is incident on the objective lens obliquely, causing an off-axis aberration such as a comatic aberration, in particular.

To overcome this problem, in the related art, a liquid crystal device is provided upstream of the objective lens to perform comatic aberration correction. However, such provision of the liquid crystal device hinders a reduction in the size and cost of the pickup.

In view of such circumstances, with the deformable mirror according to an embodiment of the present invention, the 45° mirror (or 90° mirror) originally provided in the optical system is used to realize the function of such a liquid crystal device aimed at off-axis aberration correction, thereby making it possible to achieve a reduction in the size and cost of the pickup.

Further, the deformable mirror device according to an embodiment of the present invention can also be suitably used in applications other than an optical disc apparatus. For example, the deformable mirror device can be used for a wide variety of applications, including its use as a substitute for a concave or concave lens with variable focus and as a component of a camera apparatus for effecting various kinds of aberration correction and imparting special effects.

It should be understood by those skilled in the art that various modifications, combinations, sub-combinations and alterations may occur depending on design requirements and other factors insofar as they are within the scope of the appended claims or the equivalents thereof.

What is claimed is:

1. A deformable mirror device, comprising:
    a flexible member formed so as to be deformable, having a front surface with a mirror formed thereon, at least one surface opposite the front surface, and a first portion extending along a first axis transverse to the at least one surface opposite the front surface; and
    pressure generating means configured to apply a pressure, in a direction other than along the first axis, to the first portion of the flexible member;
    wherein applying the pressure by the pressure generating means to the first portion causes a deformation of the front surface which varies depending on the direction in which the pressure is applied,
    wherein the flexible member has a cross-sectional profile such that its thickness is largest in an outermost peripheral portion and an inner peripheral portion has a thickness which decreases in a stepwise fashion from the center of the mirror surface toward an outer periphery.

2. The deformable mirror device according to claim 1, wherein the pressure generating means is configured to impart driving forces independently to any of a plurality of locations on the first portion.

3. The deformable mirror device according to claim 2, wherein the pressure generating means comprises different coils wound at a plurality of locations, and a magnetic member provided in correspondence with each of the coils, the pressure generating means being configured to impart driving forces independently to a plurality of locations on the first portion by supplying driving electric power independently to each of the coils.

4. An optical pickup apparatus comprising:
    an objective lens;
    a semiconductor laser;
    a detector; and
    a deformable mirror device,
    wherein the deformable mirror device includes:
        a flexible member formed so as to be deformable, having a front surface with a mirror formed thereon, at least one surface opposite the front surface and a first portion extending along a first axis transverse to the at least one surface opposite the front surface; and
        pressure generating means configured to apply a pressure, in a direction other than along the first axis, to the first portion of the flexible member;
        wherein applying the pressure by the pressure generating means to the first portion causes a deformation of the front surface which varies depending on the direction in which the pressure is applied,
    wherein the flexible member has a cross-sectional profile such that its thickness is largest in an outermost peripheral portion and an inner peripheral portion has a thickness which decreases in a stepwise fashion from the center of the mirror surface toward an outer periphery.

5. A deformable mirror device, comprising:
    a flexible member, having a front surface with a mirror formed thereon, at least one surface opposite the front surface and a first portion extending along a first axis transverse to the at least one surface opposite the front surface; and
    a pressure generating section configured to apply a pressure, in a direction other than along the first axis, to the first portion of the flexible member;
    wherein applying the pressure by the pressure generating section to the first portion causes a deformation of the front surface which varies depending on the direction in which the pressure is applied,
    wherein the flexible member has a cross-sectional profile such that its thickness is largest in an outermost peripheral portion and an inner peripheral portion has a thickness which decreases in a stepwise fashion from the center of the mirror surface toward an outer periphery.

* * * * *